United States Patent

Murakumo et al.

[11] Patent Number: 5,900,906
[45] Date of Patent: May 4, 1999

[54] IMAGE COMMUNICATION APPARATUS HAVING AUTOMATIC ANSWERING AND RECORDING FUNCTION

[75] Inventors: Masashi Murakumo, Fukuoka; Naomasa Nishimura; Takehiko Fujiyama, both of Kawasaki, all of Japan

[73] Assignee: Fujitsu Limited, Kanagawa, Japan

[21] Appl. No.: 08/993,955

[22] Filed: Dec. 18, 1997

[30] Foreign Application Priority Data

Aug. 19, 1997 [JP] Japan ................................ 9-222350

[51] Int. Cl.⁶ .............................. H04N 7/14; H04M 11/00
[52] U.S. Cl. ................................ 348/14; 348/15; 348/17; 370/477; 370/489; 370/538
[58] Field of Search ........................... 379/93.08; 348/17, 348/14, 15; 370/265, 477, 498, 538, 465, 468, 537

[56] References Cited

U.S. PATENT DOCUMENTS

| | | | |
|---|---|---|---|
| 4,979,028 | 12/1990 | Minematsu et al. | 348/18 |
| 5,412,418 | 5/1995 | Nishimura et al. | 348/14 |
| 5,414,457 | 5/1995 | Kadowaki et al. | 348/14 |
| 5,537,150 | 7/1996 | Sugiyama et al | 348/558 |
| 5,585,850 | 12/1996 | Schwaller | 348/388 |
| 5,650,859 | 7/1997 | Koizumi | 358/404 |
| 5,729,282 | 3/1998 | Okawa | 348/13 |
| 5,821,987 | 2/1997 | Larson | 348/19 |

FOREIGN PATENT DOCUMENTS

| | | |
|---|---|---|
| 3178247 | 8/1991 | Japan . |
| 530234 | 2/1993 | Japan . |
| 5137133 | 6/1993 | Japan . |
| 6237313 | 8/1994 | Japan . |

Primary Examiner—Paul Loomis
Assistant Examiner—Hassen Ahmed Mia
Attorney, Agent, or Firm—Helfgott & Karas

[57] ABSTRACT

Video data is coded at either a minimum transfer rate or maximum transfer rate and stored in a storage unit as a video reply message. In a case where the video data has been coded at the minimum transfer rate and stored, the video reply message is transmitted upon being multiplexed with an audio reply message if the actual transfer rate agrees with the minimum transfer rate. If the two transfer rates are different, invalid bits conforming to the difference between the rates are generated and the invalid bits, the audio reply message and the video reply message are multiplexed and transmitted. In a case where the video data has been coded at the maximum transfer rate and stored, on the other hand, the video reply message is decoded when an incoming call arrives, the video data thus obtained is coded based upon the actual transfer rate, and the video reply message obtained by coding is multiplexed with the audio reply message and transmitted.

8 Claims, 20 Drawing Sheets

IN CASE 64 kbps

IN CASE OF 128 kbps

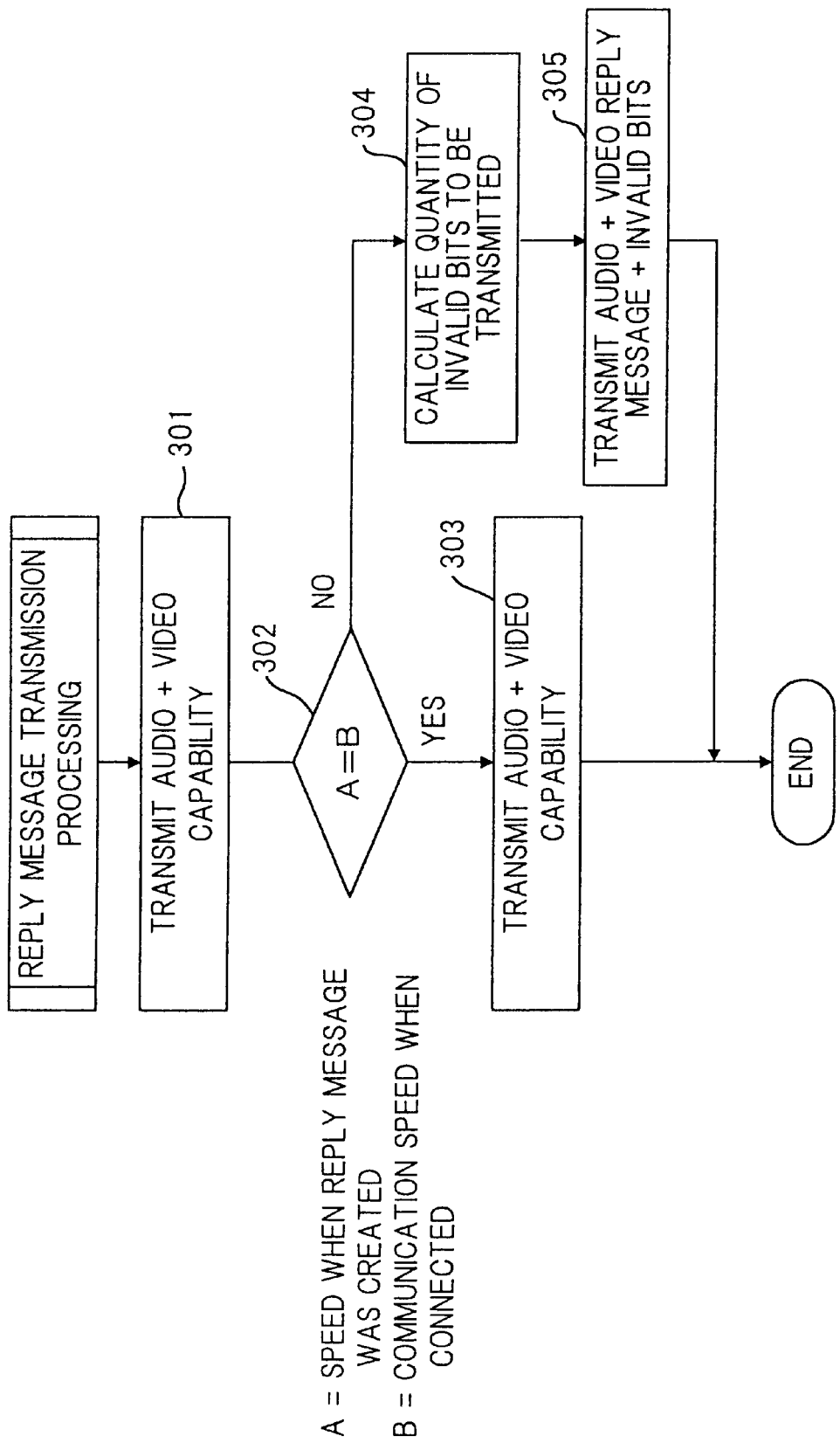

IMAGE COMMUNICATION APPARATUS HAVING AUTOMATIC ANSWERING AND RECORDING FUNCTION

BACKGROUND OF THE INVENTION

This invention relates to an image communication apparatus having an automatic answering and recording function. More particularly, the invention relates to an image communication apparatus which, when an incoming call from an originating terminal arrives in the automatic answering and recording mode, transmits a reply message comprising video and audio to the originating terminal and stores a calling-party message sent from the originating terminal.

A video conference system is one which allows a conference to take place by making possible the mutual exchange of audio and video among video conference sets deployed at remote locations. FIG. 17 is a diagram showing the configuration of a video conference system in a case where individuals at two locations remote from each other carry on a conference. The system includes a network 1 and identically constructed video conference sets 2, 3 connected to the network 1 and provided two locations remote from each other. The video conference sets 2, 3 have respective main units 2a, 3a, display monitors 2b, 3b, cameras 2c, 3c, microphones 2d, 3d and speakers 2e, 3e.

Though the details are not shown, the main units 2a, 3a of the video conference sets are each equipped with:

(1) a video A/D converter for converting an analog video signal, which has been acquired from the corresponding camera 2c or 3c, to digital video data;

(2) a video coder for compressing the digital video data obtained by the A/D conversion;

(3) an audio A/D converter for converting an analog audio signal, which has been acquired from the corresponding camera microphone 2d or 3d, to digital audio data;

(4) audio coder for compressing the digital audio data obtained by the A/D conversion;

(5) a multiplexer for multiplexing the video data and audio data compressed by the video coder and audio coder, respectively, and outputting the multiplexed data on a line;

(6) a demultiplexer for demultiplexing multiplexed data, which has entered from the line, into video data and audio data and outputting the data to a video demodulator and audio demodulator;

(7) the video demodulator for demodulating the compressed video data to the original video data;

(8) a D/A converter for converting the demodulated digital video data to an analog signal and entering the analog signal into the corresponding monitor 2b or 3b;

(9) an audio demodulator for demodulating the compressed audio data to the original audio data;

(10) a D/A converter for converting the demodulated digital audio data to an analog signal and entering the analog signal into the corresponding speaker 2e or 3e; and

(11) a line interface for sending the output signal of the multiplexer to the line and entering multiplexed data, which has entered from the line, into the demultiplexer.

The video conference sets 2, 3 thus AD-convert analog video and audio signals acquired from the cameras 2c, 3c and microphones 2d, 3d, apply coding processing (compression) to the video data and audio data obtained by the A/D conversions, multiplex the video data and audio data obtained and sent the multiplexed data out on the line. The video conference sets 2, 3 further demultiplex signals (multiplexed data), which have entered from the line, into video data and audio data, then apply decoding processing (decompression) to the compressed video data and audio data, DA-convert the digital video data and audio data obtained and enter the resulting analog signal into the monitors 2b, 3b and speakers 2e, 3e, thereby outputting video and audio.

Video conference sets having the above-described functions have come into widespread use in recent years and advances have been made in size and cost reduction and in greater functionality. Video conference sets for which there is particularly great demand are those of the type having an automatic answering and recording function that allow a calling party to leave a message if the called party is absent. Such a video conference set is particularly advantageous if there is a time difference between the calling and called parties, as when a connection is made to a party overseas.

FIG. 18 is a block diagram illustrating a video conference set having an automatic answering and recording function according to the prior art. Components identical with those shown in FIG. 17 are designated by like reference characters. The video conference set has the main body 2a, monitor 2b, camera 2c, microphone 2d and speaker 2e. The main body 2a of the video conference set includes a coder 4 having a video coder 4a and an audio coder 4b, a decoder 5 having a video decoder 5a and an audio decoder 5b, a line control unit 6 having a multiplexer, demultiplexer and line interface, etc., and a memory 7 such as a hard disk for storing a reply message comprising video and audio, and a calling-party message sent from the terminal of another (the calling) party.

The reply message RMG is created and stored in the memory 7 beforehand. The reply message RMG will amount to a very large quantity of data if the analog signals from the camera 2c and microphone 2d are merely AD-converted by a preprocessor (not shown). For this reason the analog signals are stored in the memory 7 (route C) once they have been compressed (coded) by the coder 4.

If the video conference set's own terminal set to the automatic answering and recording mode receives an incoming call from the party of another terminal under these conditions, the reply message RMG is first read out of the memory 7 and is transmitted to the calling terminal (route A) via the line control unit 6. Next, after the transmission of the reply message RMG, the verbal message MMG sent from the calling terminal is received via the line control unit 6 and stored in the memory 7 (route B).

The playback of the calling-party message MMG sent from the calling party is performed by reading the calling-party message MMG out of the memory 7 in response to a playback command, entering this message into the decoder 5, whereby the message is decoded, then converting the message to analog signals by a post-processor (not shown) and entering the analog signals into the monitor 2b and speaker 2e.

A technique known as Recommendation H.261 is used in the coding and decoding of video. FIGS. 19 and 20 are diagrams illustrating the constructions of the video coder 4a and video decoder 5a in accordance with Recommendation H.261. The video coder 4a shown in FIG. 19 includes an information source coder 4a-11 which executes processing (DCT processing, quantization processing and motion compensation processing) for compressing the information of a video signal input CIF/QCIF, a video signal multiplexing coder 4a-12 for executing data-format generation processing (hierarchical structuring processing and variable-length coding processing such as Huffman coding) after compression, a transmission buffer 4a-13 for obtaining a constant transmission data rate, a transmission coder 4a-14 for executing dummy-bit insertion processing when the transmission buffer is empty as well as processing for adding on an error correction code, and a coding controller 4a-15, to which the available capacity of the transmission buffer 4a-13 is applied as an input, for instructing the information source coder 4a-11 and video signal multiplexing coder 4a-12 to increase or decrease the amount of generated information based upon the available capacity of the buffer 4a-13, thereby controlling the amount of data that flows into the transmission buffer 4a-13.

The video coder 5a shown in FIG. 20 includes a transmission coder 5a-11 for executing dummy-bit removal processing and error correction processing, a transmission buffer 5a-12 which assures enough time for processing to decode arriving reception data, a video signal multiplexing coder 5a-13 for segmenting compressed data, and an information source coder which executes processing (inverse DCT processing, inverse quantization processing and motion compensation processing) for decompressing information that has been compressed.

Since the upper-limit value on the number of bits that can be transferred in one second is decided by the transfer rate, the video coder 4a executes coding (compression) processing maintaining such a quality that the number of bits after compression will fall within the upper-limit bit count decided by the actual transfer rate. In other words, the video coder 4a has a quality conforming to the transfer rate and executes compression processing in such a manner that the transfer can be performed at this rate.

(a) First Problem

With the video conference set having an automatic answering and recording function according to the prior art, compression processing in accordance with a fixed transfer rate is applied to the video data to create the reply message RMG, which is stored in the memory 7 (FIG. 18). Consequently, if the actual transfer rate at which communication is performed with an originating terminal after the arrival of the incoming call differs from the fixed transfer rate mentioned above, the reply message will no longer be capable of being transmitted correctly. For example, if a reply message RMG that has been created by execution of compression processing conforming to a transfer rate of 128 kbps is transmitted to a line at a higher transfer rate of 384 kbps, the display on the terminal that originated the call will reproduce video that appears to be fast-forwarded. Conversely, if a reply message RMG that has been created by execution of compression processing conforming to the transfer rate of 384 kbps is transmitted to a line at the lower transfer rate of 128 kbps, the display on the terminal that originated the call will reproduce video on a slow frame-by-frame basis.

In an effort to solve this problem, the conventional practice is to create a reply message for each transfer rate in advance so as to establish correspondence between the reply messages and various transfer rates. Then, when a connection is made, the reply message corresponding to the actual transfer rate is selected and transmitted. With this method, however, creating the reply messages takes considerable time and a memory having a large storage capacity is required to store the reply messages.

Further, with the prior art, there are instances where the user abandons the inclusion of video in a reply message and usually sends only audio as the reply message. However, a method which sends only audio as the reply message in spite of the fact that video can also be sent and received is without merit detracts from the value of the product.

(b) Second Problem

If, during the reception of a calling-party message from the calling terminal following the transmission of the reply message from the called terminal to the calling terminal, video acquired from the camera of the called terminal is transmitted, the circumstances prevailing in the absence of the user of the called terminal will be transmitted to the calling terminal in the form of an image. This is a problem in terms of security. Conventional approaches for solving this problem include lowering camera brightness and sending a dark image without sound after transmission of the reply message is completed, preserving the final video and sending this video without sound, or sending nothing at all. However, this method of presenting a display is very unnatural and gives the observer at the calling terminal an odd impression.

(c) Third Problem

In the prior art, the calling-party message sent from a videophone or video conference set is separated into audio and video, after which separate files are created and stored. With this method of separating and storing the message, it is necessary to synchronize the audio and video when the calling-party message is played back. Establishing this synchronization is troublesome.

(d) Fourth Problem

According to the prior art, there is no limitation upon the file sizes of the reply message file and calling-party message file and upon the number of calling-party messages stored. This necessitates large-capacity memory means for storing these messages. The result is an increase in the size and cost of the apparatus.

SUMMARY OF THE INVENTION

Accordingly, a first object of the present invention is to provide an image communication apparatus having an automatic answering and recording function through which a reply message can be composed of video and audio, and moreover through which only a video reply message obtained by compression processing in accordance with a single transfer rate need be stored in memory to make it possible to accommodate various actual transfer rates that differ from the above-mentioned transfer rate.

A second object of the present invention is to provide an image communication apparatus having an automatic answering and recording function through which video that does not give a calling party an odd impression can be transmitted after the transmission of a reply message to the calling party has been completed.

A third object of the present invention is to provide an image communication apparatus having an automatic answering and recording function so adapted that a calling-party message is stored in multiplexed form as is without being separated into audio and video and is subsequently, i.e., at playback, input to a monitor and an audio device of the called terminal upon being separated into audio and video at the time of playback, wherein synchronization of the audio and video is not required at playback of the message.

A fourth object of the present invention is to provide an image communication apparatus having an automatic answering and recording function through which the file size of a reply message file or calling-party message file is limited as well as the number of files of calling-party messages that can be stored, thereby making it possible to reduce the storage capacity of memory means, reduce the size of the apparatus and lower cost.

According to the present invention, the first object is attained by providing an image communication apparatus comprising a video coder for compressing video data, which has been acquired from a camera, based upon a specified transfer rate, an audio coder for compressing audio data, which has been acquired from a microphone, based upon a fixed transfer rate regardless of the specified transfer rate, memory means for storing the video data and audio data, compressed by the video coder and audio coder, as a video reply message and an audio reply message, respectively, and control means for comparing an actual transfer rate at which communication is performed with an originating terminal when a reply message is sent and a transfer rate specified when the video data is compressed, multiplexing the audio reply message and the video reply message and sending the messages to a line if the transfer rates compared agree, and sending only the audio reply message to the line and not the video reply message if the transfer rates compared are different.

According to another aspect of the present invention, the first object is attained by providing an image communication apparatus comprising a video coder for compressing video data, which has been acquired from a camera, based upon a low transfer rate (e.g., a minimum transfer rate) set in advance, an audio coder for compressing audio data, which has been acquired from a microphone, based upon a fixed transfer rate, memory means for storing the video data and audio data, compressed by the video coder and audio coder, as a video reply message and an audio reply message, respectively, and control means for comparing an actual transfer rate at which communication is performed with an originating terminal and the low transfer rate when a reply message is sent, multiplexing the audio reply message and the video reply message and sending the messages to a line if the transfer rates compared agree, and generating invalid bits for a period of time that corresponds to a rate difference between the actual transfer rate and the low transfer rate if the transfer rates compared disagree, multiplexing the invalid bits, the audio reply message and the video reply message and sending them to a line.

According to another aspect of the present invention, the first object is attained by providing an image communication apparatus comprising a video coder which, at creation of a video reply message, compresses video data, which has entered from a camera side, based upon a high transfer rate (e.g., a maximum transfer rate) set in advance, and which, at transmission of the video reply message, compresses video data, which has entered from a video decoder side, based upon a specified transfer rate, an audio coder for compressing audio data, which has been acquired from a microphone, based upon a fixed transfer rate, memory means for storing the video data from the camera side compressed by the video coder and the audio data compressed by the and audio coder as a video reply message and an audio reply message, respectively, and control means for performing control in such a manner that the video reply message read out of the memory means is entered into the video coder via the video decoder when a reply message is sent, inputting the video coder an actual transfer rate as the specified transfer rate, multiplexing the video reply message compressed by the video coder based upon the actual transfer rate and the audio reply message and sending the messages to a line.

According to the present invention, the second object is attained by providing an image communication apparatus comprising means for storing video to be sent after transmission of a reply message is completed, and means for repeatedly transmitting the video, which continues to be stored in the memory means, after transmission of the reply message is completed.

According to the present invention, the third object is attained by providing an image communication apparatus comprising memory means for storing a reply message separately as a video reply message and an audio reply message and storing a calling-party message, and control means for controlling storage of the audio reply message and video reply message in the memory means, wherein when an incoming call has arrived in an automatic answering and recording mode, the control means reads the separately stored audio reply message and video reply message out of the memory means and enters them into a multiplexer, and stores a calling-party message, which has entered from a line, in the memory means in a multiplexed format without separating this message into audio and video, and when the calling-party message is played back, the control means reads the calling-party message out of the memory means and enters the message into a demultiplexer.

According to the present invention, the fourth object is attained by providing an image communication apparatus comprising a function which, when a reply message file is created and stored in memory means, monitors the file size of the reply message file during the creation thereof and terminates the processing for creating the reply message file if the file size exceeds a set value, a function which, when a calling-party message file is created and stored in the memory means, monitors the file size of the calling-party message file during the creation thereof and terminates the processing for creating the calling-party message file if the file size exceeds a set value, and a function for monitoring the number of created calling-party message files and forgoing execution of the automatic answering and recording function, even if there is an incoming call, when the number of files exceeds the set value.

Other features and advantages of the present invention will be apparent from the following description taken in conjunction with the accompanying drawings.

BRIEF DESCRIPTION OF THE DRAWINGS

FIG. 13 is a flowchart of processing for transmitting a reply message according to the second embodiment;

DESCRIPTION OF THE PREFERRED EMBODIMENTS

Figure 1:
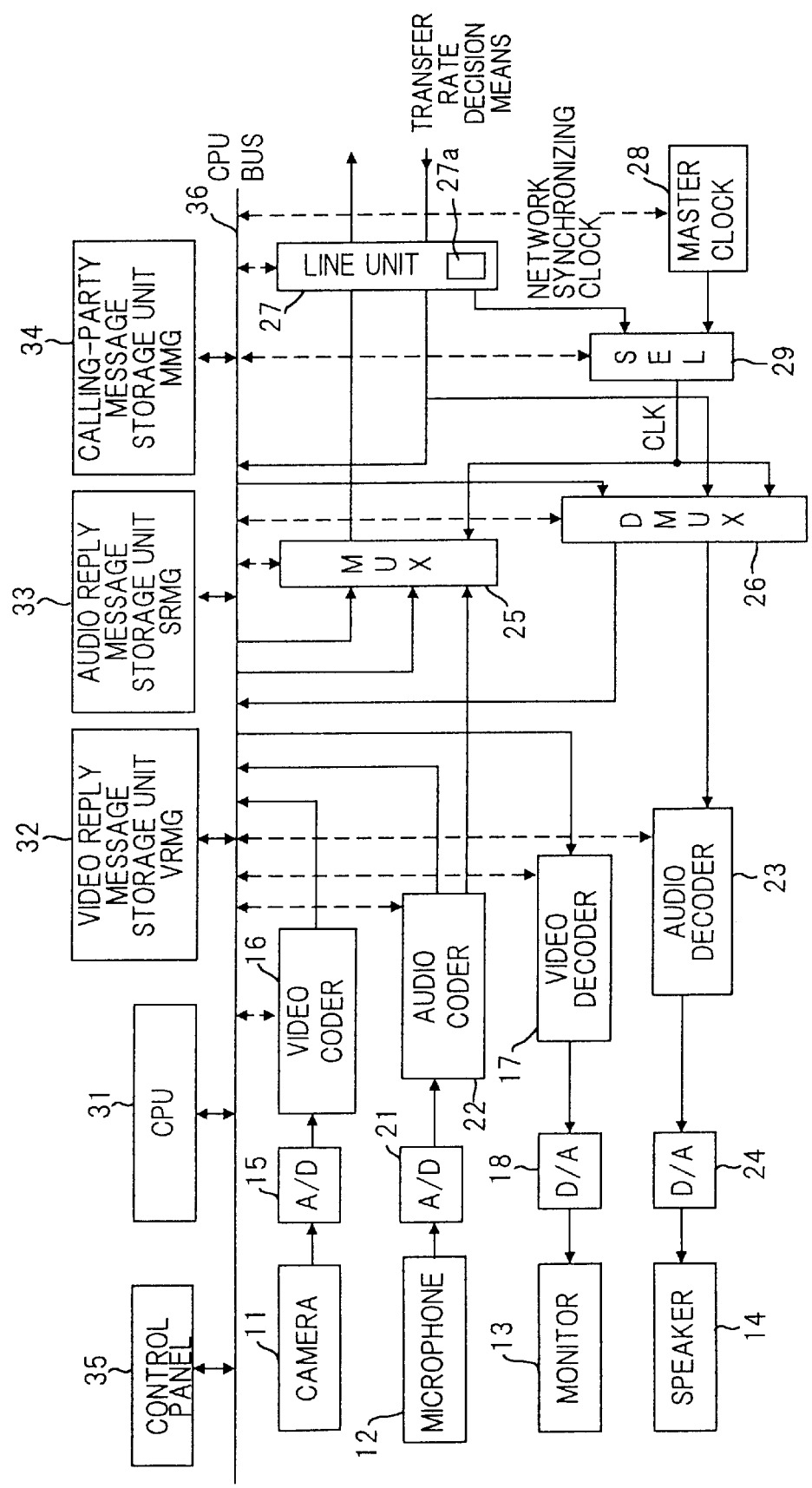
FIG. 1 is a block diagram showing the construction of an image communication apparatus.

(A) Image Communication Apparatus Having Automatic Answering and Recording Function (a) Configuration FIG. 1 is a block diagram showing the construction of an image communication apparatus having an automatic answering and recording function. An example of such an apparatus is a video conference set. The apparatus includes a camera 11, a microphone 12, a monitor 13, a speaker 14, a video A/D converter 15 for converting an analog video signal acquired from the camera 11 to digital video data, a video coder 16 for coding (compressing) the digital video data obtained by the A/D conversion, a video decoder 17 for restoring (decompressing) compressed video data to the original video data, a D/A converter 18 for converting the restored digital video data to an analog signal and entering the analog signal into the monitor 13, an audio A/D converter 21 for converting an analog audio signal acquired from the microphone 12 to digital audio data, an audio coder 22 for compressing the digital audio data obtained by the A/D conversion, an audio decoder 23 for restoring compressed audio data to the original audio data, a D/A converter 24 for converting the restored digital audio data to an analog signal and outputting the analog signal from the speaker 14, a multiplexer 25 and a demultiplexer 26. The multiplexer 25 (1) multiplexes and then outputs the video data and audio data compressed by the video coder 16 and audio coder 22 and (2) combines and outputs an audio reply message and a video reply message. The demultiplexer 26 (1) demultiplexes multiplexed data, which has entered from a line, into video data and audio data and outputs the video data to the video decoder 17 and the audio data to the audio decoder 23, and (2) demultiplexes a message from a calling party into video data and audio data and outputs the video data to the video decoder 17 and the audio data to the audio decoder 23.

The apparatus further includes a line unit 27 for sending the output of the multiplexer 25 to the line and entering multiplexed data, which has entered from the line, into the demultiplexer 26. The line unit 27 has transfer rate decision means 27a for deciding the actual transfer rate with respect to another party's terminal. The apparatus further includes a clock generator 28 for generating a master clock having a fixed speed, and a selector 29 for selecting a network synchronizing clock, which has been acquired from a network, or the master clock.

A processor (CPU) 31 controls the overall video communication apparatus, a video reply message storage unit 32 stores a video reply message VRMG from a reply message RMG, an audio reply message storage unit 33 stores an audio reply message SRMG from the reply message RMG, and a calling-party message storage unit 34 stores a message MMG from a calling party without separating the message into video and audio. A control panel 35 is for operating the apparatus. The CPU bus is indicated at 36.

The video reply message VRMG and audio reply message SRMG which make up the reply message are separately in the video reply message storage unit 32 and audio reply message storage unit 33, respectively, and the calling-party message MMG is stored in the calling-party message storage unit 34 as is without being separated into video and audio. The storage units 32~34 may consist of separate memory devices. Alternatively, a single storage medium such as a hard disk can be partitioned into three areas and the video reply message, audio reply message and calling-party message can be stored in respective ones of these three areas.

The delivery of video data between the video coder 16 and line unit 27 and between the video decoder 17 and line unit 27 is carried out via the CPU bus 36, multiplexer 25 and demultiplexer 26. The delivery of audio data between the video audio 22 and line unit 27 and between the audio decoder 23 and line unit 27 is carried out via the multiplexer 25 and demultiplexer 26 without the intermediary of the CPU bus 36. In case of master-slave synchronization, the line unit 27 extracts a clock from the network and delivers the clock to the multiplexer 25 and demultiplexer 26.

(b) Deciding Transfer Rate

Figure 2A:
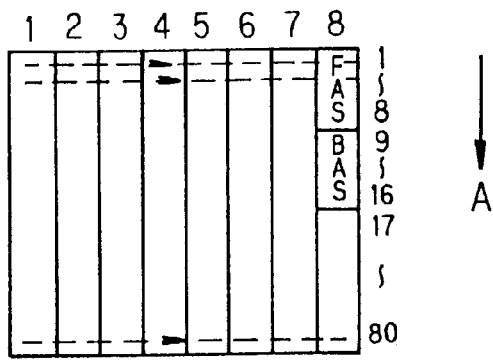
FIGS. 2A~2C are diagrams useful in describing decision of transfer rate.
Figure 2B:
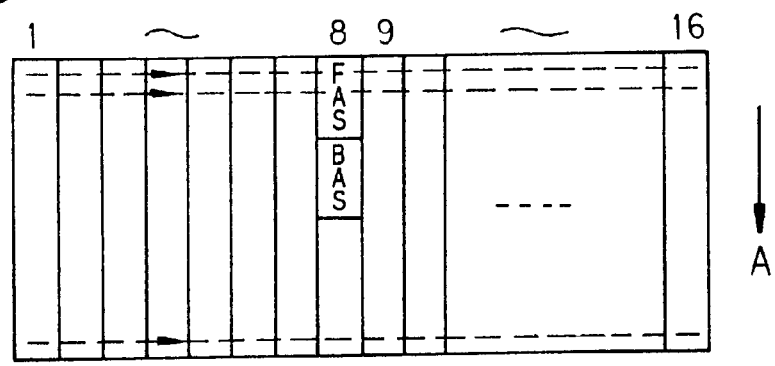
Figure 2C:
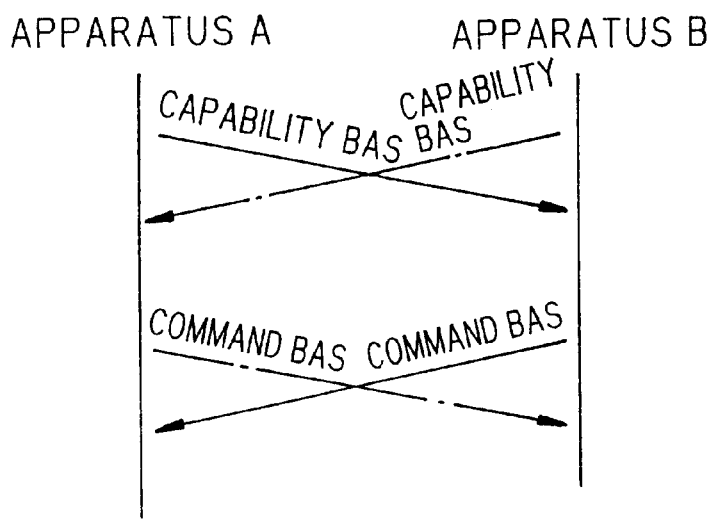

FIGS. 2A~2C are diagrams useful in describing decision of transfer rate. FIG. 2A shows the structure of a frame when the transfer rate is 64 kbps. FAS represents an 8-bit synchronizing signal and BAS an 8-bit bit-rate allocation signal. Eight bits at a time are transmitted in the A direction every 125 μs. FIG. 2B shows the structure of a frame when the transfer rate is 128 kbps. FAS represents an 8-bit synchronizing signal and BAS an 8-bit bit-rate allocation signal. Sixteen bits at a time are transmitted in the A direction every 125 μs. FIG. 2C shows the sequence through which transfer rate is decided. A transmitter-receiver decides the bit rate (transfer rate) by performing a capability exchange using BAS (capability BAS, command BAS). An originating terminal (apparatus B) sends a terminating terminal (apparatus A) the receivable transfer rate using the capability B. Upon receiving the capability BAS, the apparatus A decides a transfer rate within limits declared by the capability BAS, notifies the apparatus B of the transfer rate using the command BAS and then performs communication at the transfer rate that has been decided.

(c) Operation for Ordinary Conferencing

When a call is originated from its own terminal or when there is an incoming call from a calling terminal, the line unit 27 executes a line protocol (the H.221 protocol) and coordinates conditions for the connection to the other terminal. At this time the transfer rate decision means 27a recognizes the transfer rate required for the other terminal by referring to the BAS data that has been inserted into the H.221 frame, decides the transfer rate of the line and so notifies the CPU 31. On the basis of this transfer rate, the CPU 31 sets various parameters necessary for coding in the video coder 16. Since coding is to be performed in accordance with the Recommendation H.261, quantization values, frame rate and the like are set as parameters to conform to the transfer rate.

After the connection to the line is made, the A/D converter 21 converts the audio signal that has entered from the microphone 12 to digital audio data, and the audio coder 22 subjects this digital audio data to coding processing. Further, the A/D converter 15 converts the video signal that has entered from the camera 11 to digital video data, and the image coder 16 subjects this digital video data to coding processing in accordance with the set parameter (transfer rate) and outputs compressed image data in accordance with H.261. The multiplexer 25 multiplexes the coded audio and video data and sends the multiplexed data to the line via the line unit 27.

Upon receiving multiplexed data from the other party's terminal, the line unit 27 enters the data into the demultiplexer 26, which then proceeds to demultiplex this multiplexed data into audio data and video data. The demultiplexed video data enters the video decoder 17 via the CPU bus 36, and the audio data enters the audio decoder 23 directly. The video decoder 17 and audio decoder 23 subject the entered video data and audio data to decoding processing, the D/A converters 18, 24 convert the decoded video data and audio data to analog signals and the audio and video analog signals enter the monitor 13 and speaker 14, respectively.

(B) First Embodiment
(a) Control for Creating/Transmitting Reply Message

Figure 3:
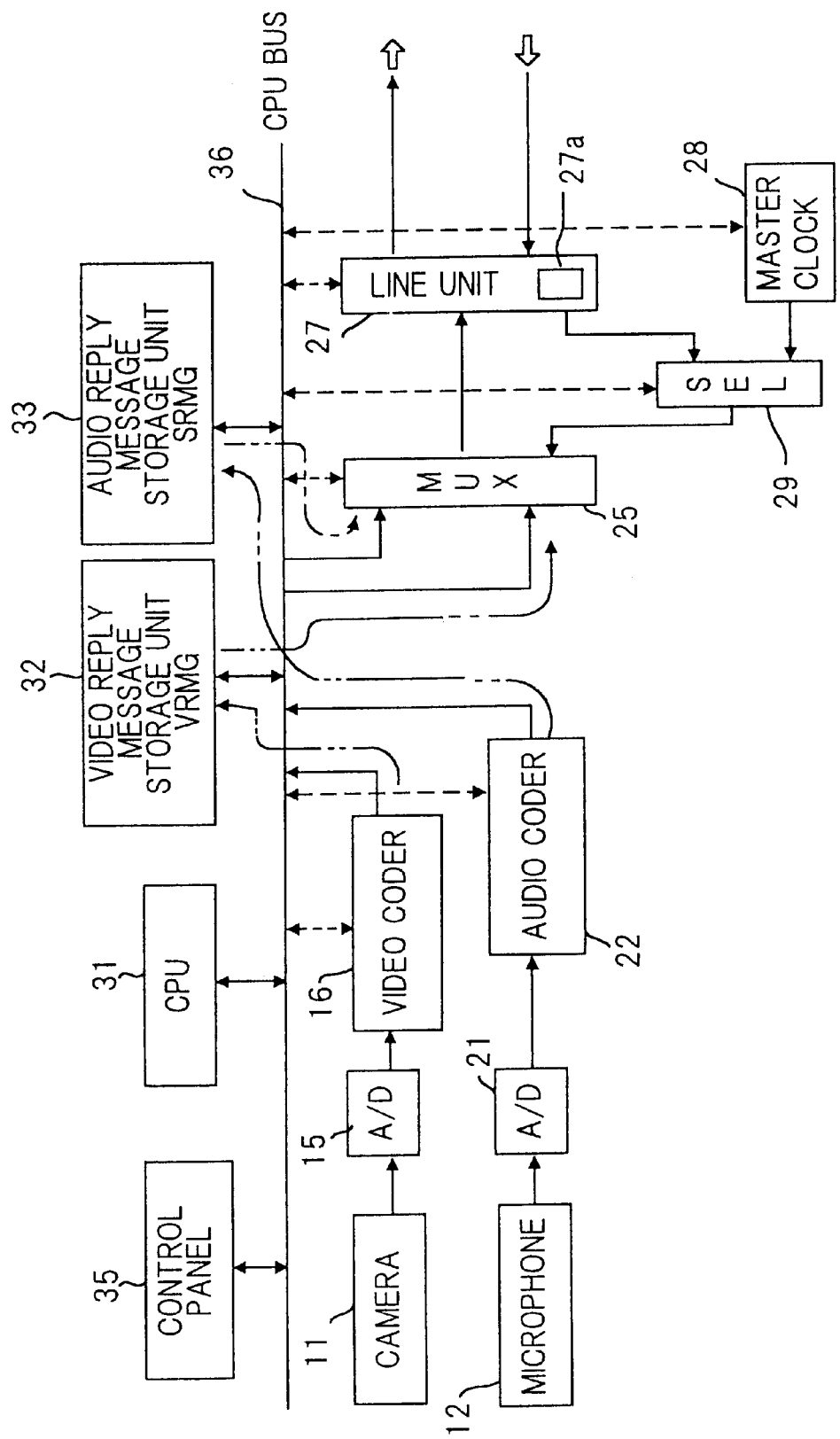
FIG. 3 is a diagram useful in describing control for creating/transmitting a reply message.

FIG. 3 is a diagram useful in describing control for creating/transmitting a reply message. Components identical with those shown in FIG. 1 are designated by like reference characters.

Creation of Reply Message

The video A/D converter 15 converts the analog video signal (in accordance with the NTSC) that has entered from the camera 11 to digital video data, the video coder 16 codes the digital video data based upon a transfer rate specified separately by the user, and the CPU 31 stores the coded video data in the video reply message storage unit 32 as the video reply message VRMG. The A/D converter 21 converts the analog audio signal that has entered from the microphone 12 to digital audio data, the audio coder 22 applies coding processing to the digital video data based upon a fixed transfer rate (e.g., 56 kbps), and the CPU 31 stores the coded audio data in the audio reply message storage unit 33 as the audio reply message SRMG. Since communication is not yet taking place, the selector 29 enters the master clock, which is output by the master clock generator 28, into each of the components of the apparatus.

Transmission of Reply Message

If an incoming call arrives after the automatic answering and recording mode has been established, the CPU 31 compares the actual transfer rate decided by the transfer rate decision means 27a and the transfer rate that was designated by the user at compression of the video data. If the transfer rates agree, the CPU 31 reads the video reply message VRMG out of the video reply message storage unit 32, enters this message into the multiplexer 25, reads the audio reply message SRMG out of the video reply message storage unit 32 and enters this message into the multiplexer 25. The multiplexer 25 multiplexes the video reply message VRMG and audio reply message SRMG and transmits the multiplexed messages via the line unit 27. If the transfer rates do not agree, however, the CPU 31 sends only the audio reply message SRMG and not the video reply message VRMG to the line. Since communication is now taking place, the selector 29 selects the network clock from the network and enters the clock into each of the components of the apparatus.

Control for Coding and Multiplexed Transmission of Reply Message

Figure 4A:
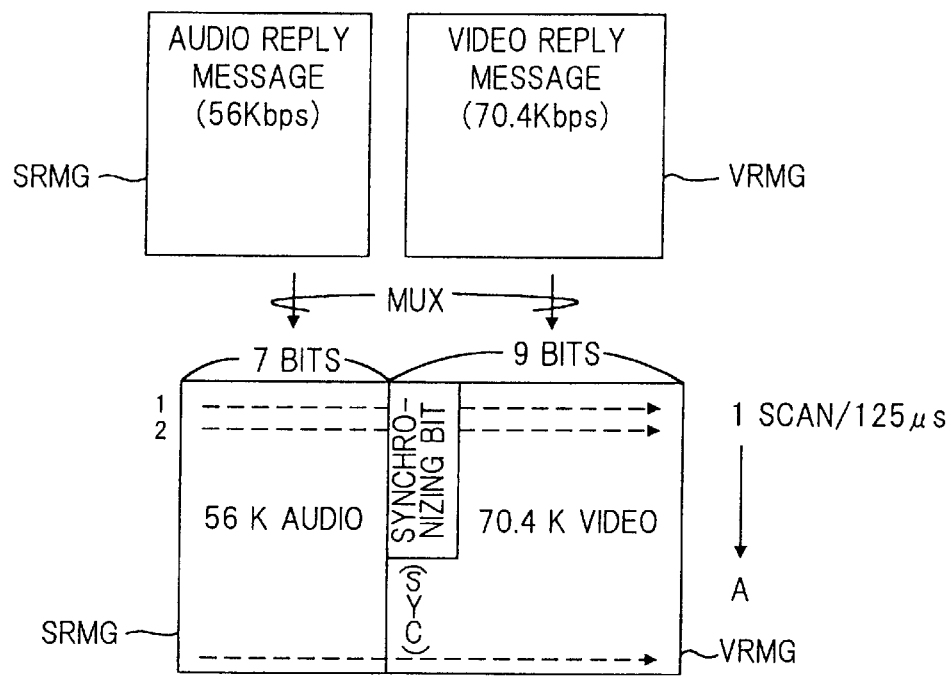
FIGS. 4A, 4B are diagrams useful in describing control for coding a reply message and control for multiplexed transmission of the reply message.
Figure 4B:
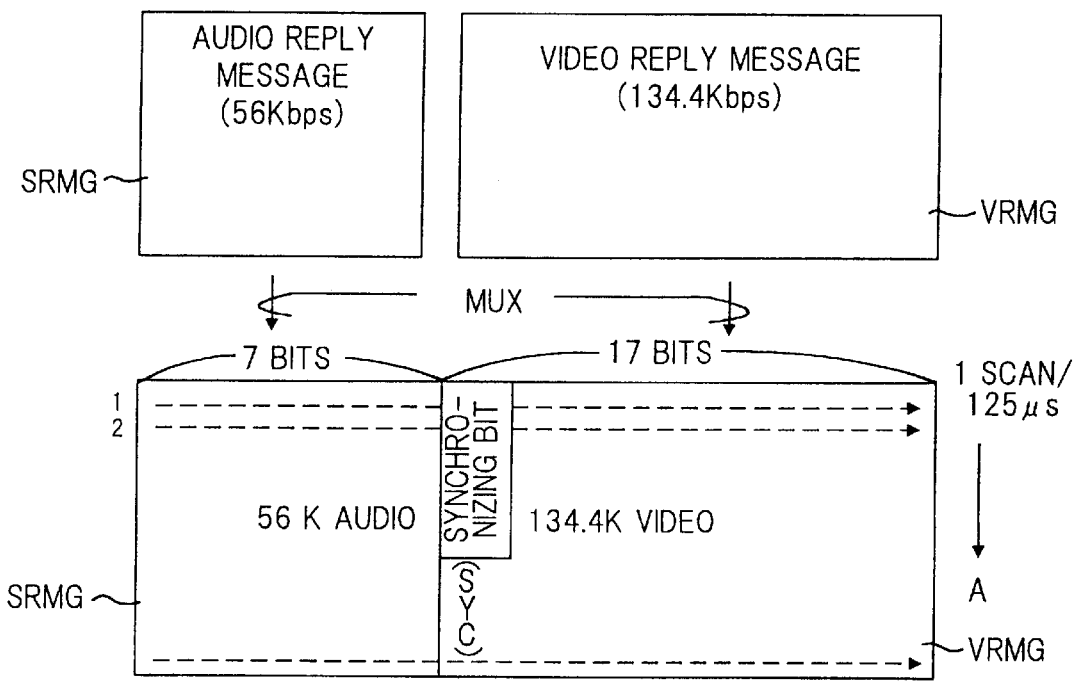

FIGS. 4A, 4B are diagrams useful in describing control for coding a reply message and control for multiplexed transmission of the reply message.

If the user designates 128 kbps as the transfer rate when a reply message is created, the audio coder 22 performs coding so as to obtain a quality equivalent to 56 kbps, the video coder 16 performs coding so as to obtain a quality equivalent to a communication rate of 70.4 (=128−56−1.6) kbps, and these are stored in the storage units 32 and 33, respectively. At transmission of this reply message, a 1.6-kbps synchronizing bit SYC is added onto the video reply message VRMG to establish a transfer rate of 72 kbps, the video reply message VRMG and audio reply message SRMG are multiplexed (MUX) and the multiplexed messages are sent to the line. In other words, 7-bit audio reply data and 9-bit video reply data are multiplexed every 125 $\mu$s and these items of data are sent to the line successively in the direction of arrow A.

If the user designates 192 kbps as the transfer rate when a reply message is created, the audio coder 22 performs coding so as to obtain a quality equivalent to 56 kbps, the video coder 16 performs coding so as to obtain a quality equivalent to a communication rate of 134.4 (=192−56−1.6) kbps, and these are stored in the storage units 32 and 33, respectively. At transmission of this reply message, the 1.6-kbps synchronizing bit SYC is added onto the video reply message VRMG to establish a transfer rate of 136 kbps, the video reply message VRMG and audio reply message SRMG are multiplexed (MUX) and the multiplexed messages are sent to the line. In other words, 7-bit audio reply data and 17-bit video reply data are multiplexed every 125 $\mu$s and these items of data are sent to the line successively in the direction of arrow A.

(b) Storage/Readout of Reply Message

Figure 5:
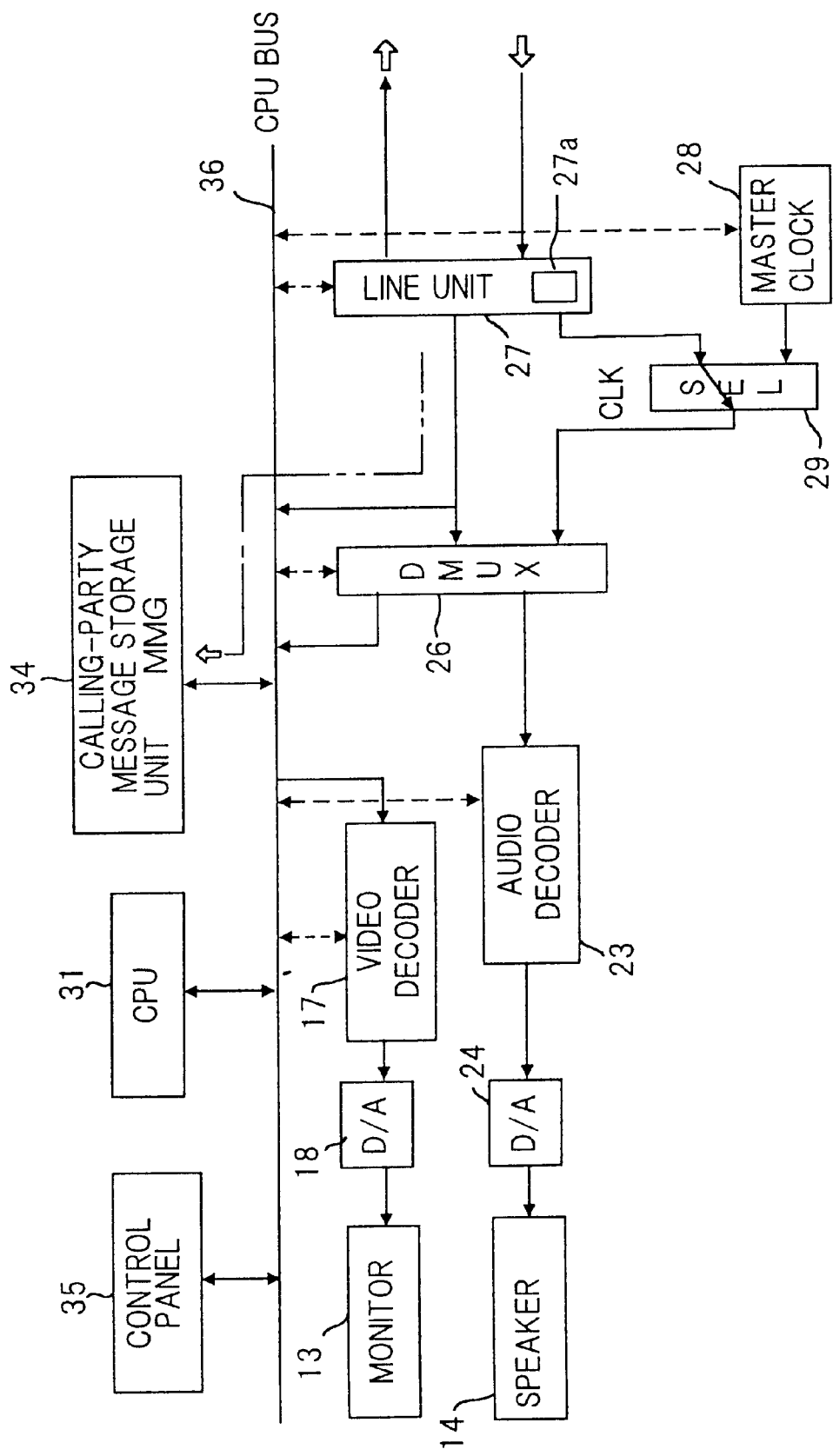
FIG. 5 is a diagram useful in describing control for storing a message from a calling party.
Figure 6:
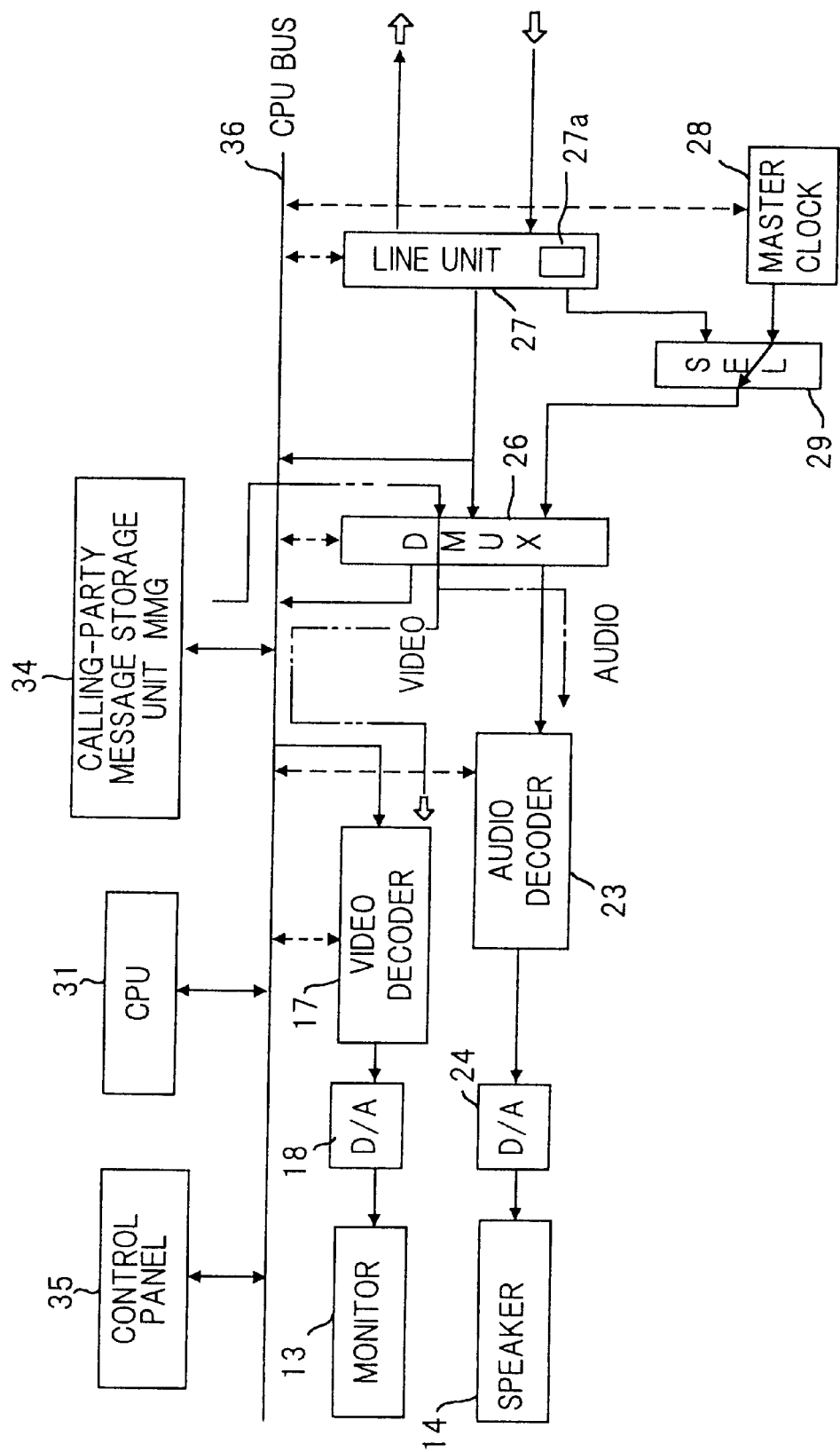
FIG. 6 is a diagram useful in describing control for reading out the calling-party message.

FIG. 5 is a diagram useful in describing control for storing a message from a calling party, and FIG. 6 is a diagram useful in describing control for reading out the calling-party message. Components identical with those shown in FIG. 1 are designated by like reference characters.

Storage Control

If transmission of the reply message RMG has been completed following arrival of an incoming call from an originating terminal with the apparatus being in the automatic answering and recording mode, the CPU 31 instructs the originating terminal to transmit the calling-party message. The originating terminal responds by starting the transmission of the calling-party message, which comprises video and audio.

Upon receiving the calling-party message (see FIG. 5), the line unit 27 outputs this message to the side of the demultiplexer 26. The CPU 31 stores the calling-party message MMG in the calling-party message storage unit 34 as is without separating the message into audio and video. Since communication is now taking place, the selector 29 selects the network clock from the network and enters the clock into each of the components of the apparatus.

Readout Control

If a request for playback of the calling-party message MMG is issued from the control panel 35 (see FIG. 6), the CPU 31 reads the calling-party message MMG out of the calling-party message storage unit 34 in which it has been stored and enters this message into the demultiplexer 26.

The latter demultiplexes the calling-party message MMG into video data and audio data, enters the video data into the video decoder 17 via the CPU bus 36 and enters the audio data into the audio decoder 23 directly. The video decoder 17 restores the coded video data to the original video data, and the D/A converter 18 converts the restored video data to an analog video signal and applies the video signal to the monitor 13, whereby the video is displayed. The audio decoder 23 restores the coded audio data to the original audio data, and the D/A converter 14 converts the restored audio data to an analog audio signal and applies the audio signal to the speaker 14, whereby the audio is played back. Since communication is not yet taking place, the selector 29 selects the master clock from the master clock generator 28 and enters this clock into each of the components of the apparatus.

(c) Processing for Creating Reply Message

Figure 7:
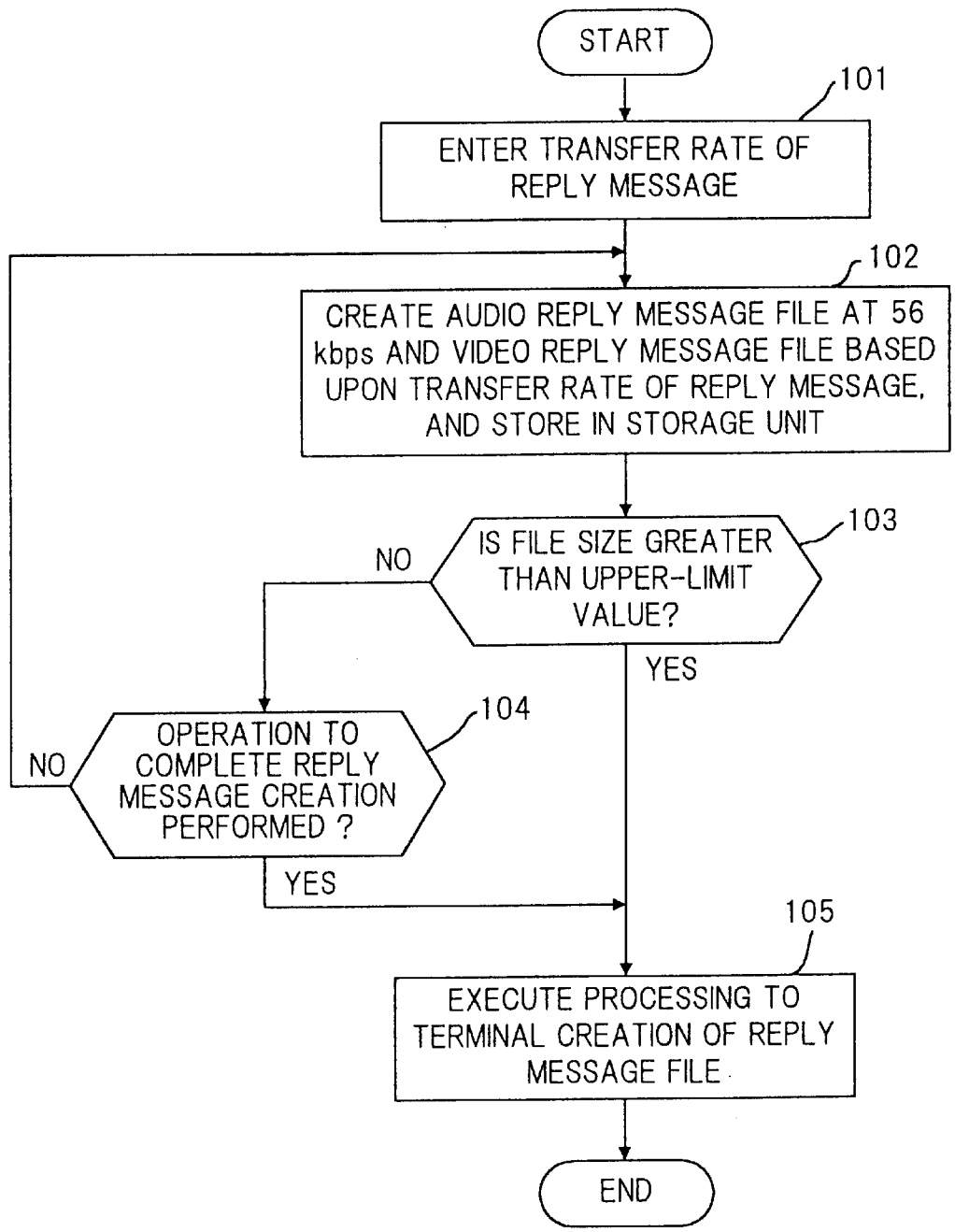
FIG. 7 is a flowchart of processing for creating a reply message.

FIG. 7 is a flowchart of processing for creating a reply message.

A transfer rate A necessary when video data is coded is entered from the control panel 35 (see FIG. 3) at step 101.

Next, when audio is entered from the microphone 12 and video from the camera 11, the audio coder 22 performs coding to obtain a quality equivalent to 56 kbps and creates an audio reply message file. The CPU 31 stores this file in the storage unit 33. The video coder 16 performs coding to obtain a quality equivalent to (A−56−1.6) kbps and creates a video reply message file. The CPU 31 stores this file in the storage unit 32 (step 102).

In parallel with the above processing for file creation, the CPU determines whether the file size of the reply message file has exceeded an upper-limit value set in advance (step 103).

If the file size has not exceeded the upper-limit value, the CPU determines whether a completion operation for completing the creation of the reply message file has been performed (step 104). If creation of the file has not been completed, then file creation/storage processing is continued from step 102 onward. If file creation processing has been completed, however, or if the file size is found to exceed the upper-limit value at step 103, processing for creating the reply message file is terminated (step 105). As a result, it is possible to prevent the reply message file from growing without limit, thereby making it possible to conserve memory and shorten reply message transfer time.

It should be noted that an arrangement may be adopted in which it is determined whether the size of the video reply message file rather than the size of the reply message has exceeded the upper-limit value.

Figure 8:
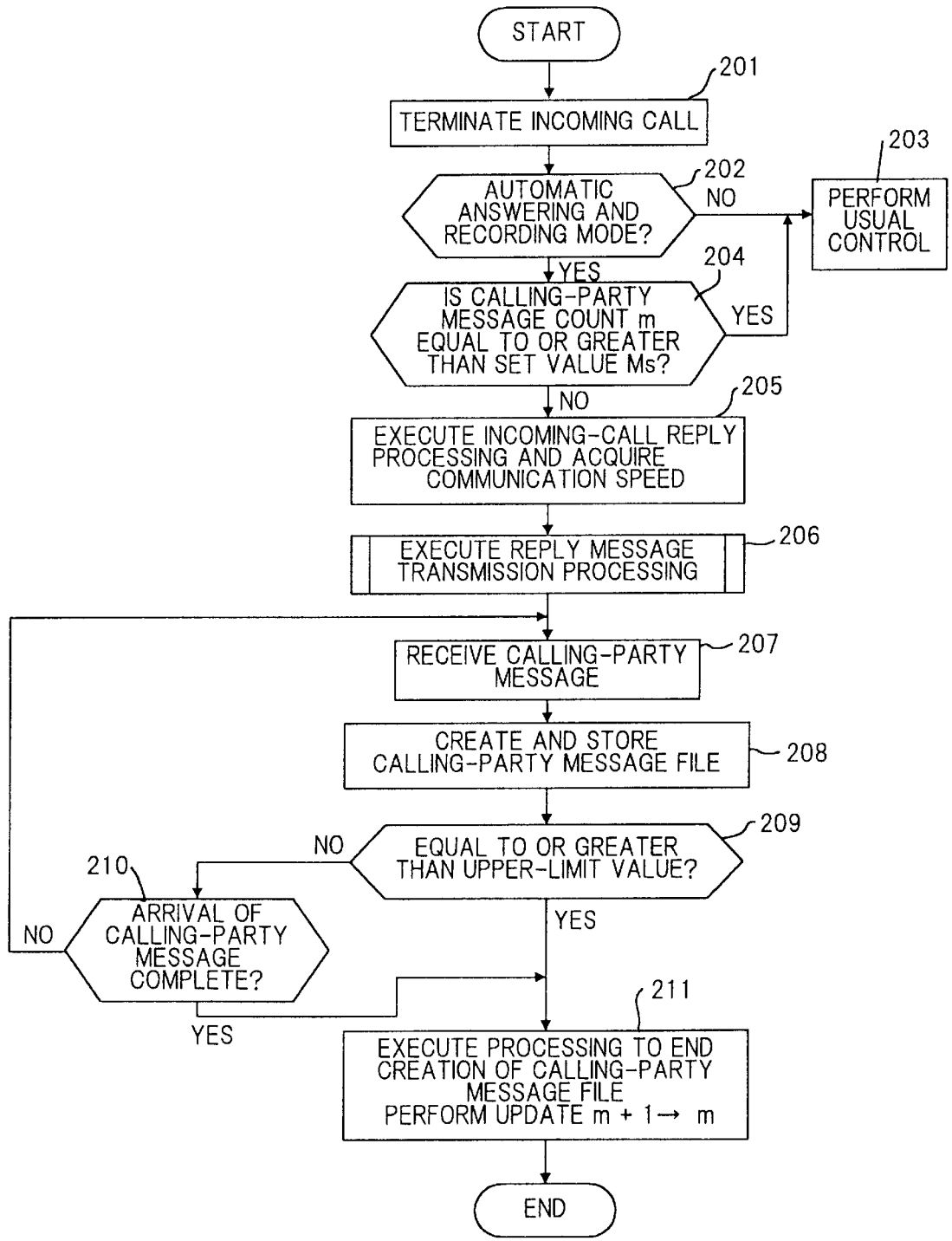
FIG. 8 is a flowchart of processing executed when terminating a call.
Figure 9:
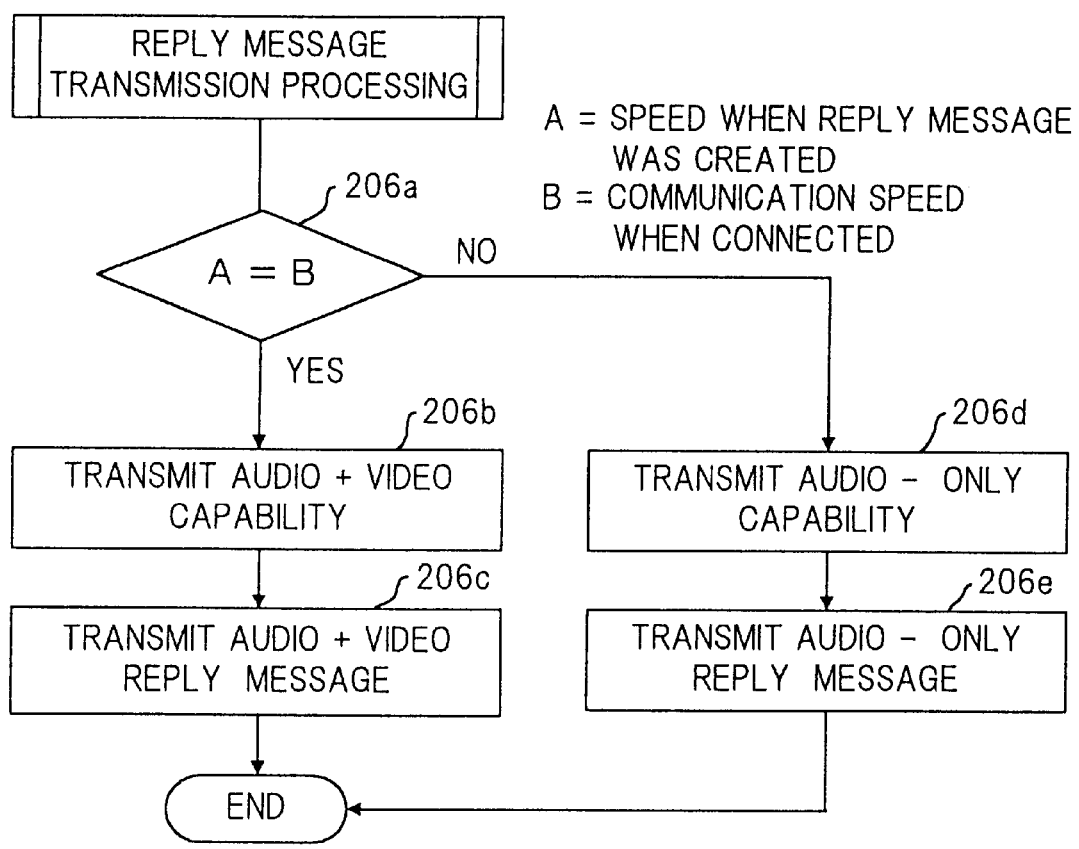
FIG. 9 is a flowchart of processing for transmitting a reply message.

(d) Processing for Transmitting Reply Message and Processing for Storing Calling-Party Message at Time of Incoming Call FIG. 8 is a flowchart of processing executed when terminating a call, FIG. 9 is a flowchart of processing for transmitting a reply message.

When a call is terminated at this apparatus (i.e., when the apparatus is called), it is determined whether the automatic answering and recording mode has been set (steps 201, 202). If this mode has not been set, ordinary call termination processing is executed (step 203).

If the automatic answering and recording mode has been set, it is determined whether the count m of calling-party message files is equal to or greater than a set count Ms (step 204). If m≧M holds, ordinary call termination processing is executed, regardless of the fact that the prevailing mode is the automatic answering and recording mode. This means that transmission of a reply message and recording of a calling-party message are not performed. As a result, the number of calling-party message files can be kept less than the set value, thereby making it possible to conserve memory.

If m<Ms is found to hold at step S204, then incoming-call reply processing is executed to acquire actual transfer rate B decided by the connection between this apparatus as the originating terminal (step 205), after which processing for transmitting a reply message is executed in the manner shown in FIG. 9 (step 206).

In the processing (step 206) for transmitting a reply message, the CPU 31 compares the actual transfer rate B with a transfer rate A that was specified at the creation of the reply message file (step 206a). If A=B holds, "audio+video capability" is transmitted to the originating terminal by the BAS data (step 206b), after which the video reply message VRMG and audio reply message SRMG are read out of the storage units 32, 33 (FIG. 3), multiplexed (see FIG. 4) and sent to the originating terminal (step 206c).

Figure 10:
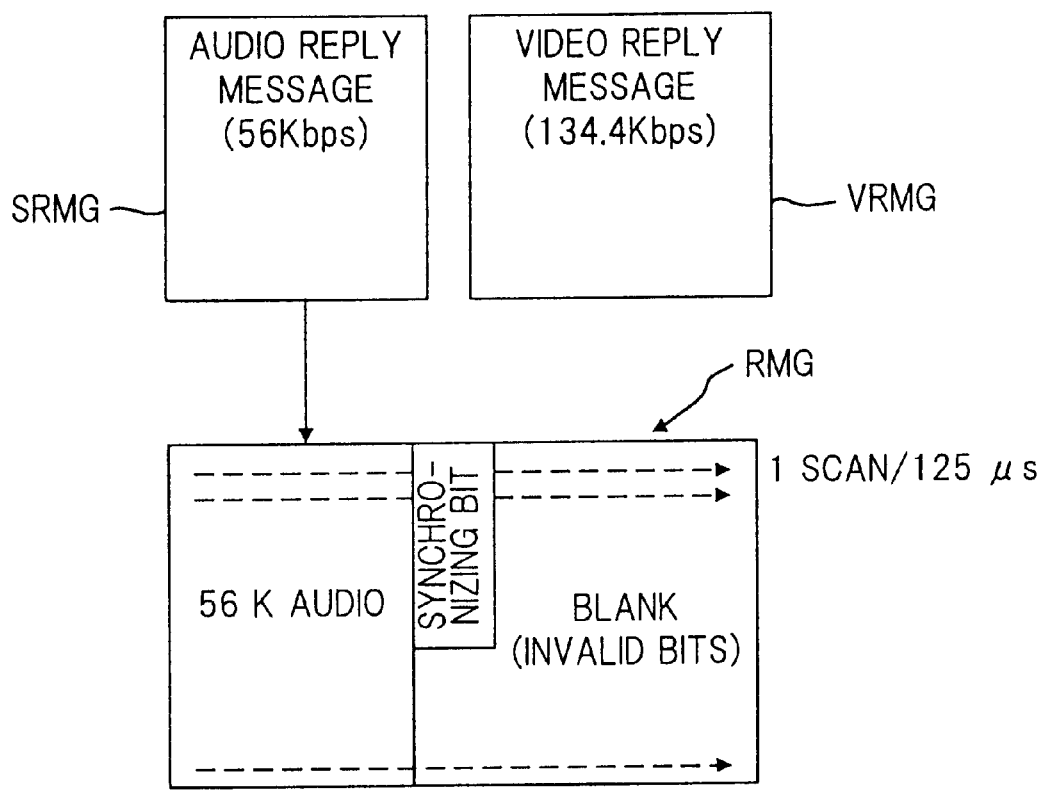
FIG. 10 is a diagram useful in describing a reply message when A≠B holds.

If A≠B and not A=B is found to hold at step 206a, on the other hand, "audio capability only" is transmitted to the originating terminal by the BAS data (step 206d), after which the audio reply message SRMG only is read out of the storage unit 33 (FIG. 3) and sent to the originating terminal via the multiplexer 25 (step 206e). FIG. 10 is a diagram useful in describing the reply message RMG output from the multiplexer 25 when A≠B holds (A=192 kbps, B=128 kbps). The part that is the video reply message is blank (i.e., composed of invalid bits).

With reference again to FIG. 8, the calling-party message from the originating terminal is received and the message is stored successively in the calling-party message storage unit 34 (FIG. 5) at steps 207, 208 when the processing for transmitting the reply message of step 206 is completed.

In parallel with the above processing for creating the calling-party message file, the CPU determines whether the file size of the calling-party message file has exceeded an upper-limit value set in advance (step 209).

If the file size has not exceeded the upper-limit value, the CPU determines whether arrival of the calling-party message is complete (step 210). If arrival is not complete, then calling-party message file creation/storage processing is continued from step 207 onward. If arrival of the calling-party message is complete, however, or if the file size is found to exceed the upper-limit value at step 209, processing for creating the calling-party message file is terminated and the file count m is updated (step 211). As a result, it is possible to prevent the calling-party message file from growing without limit, thereby making it possible to conserve memory and shorten calling-party message transfer time.

(C) Second Embodiment

In the first embodiment, a video reply message is created by executing coding processing based upon a transfer set by the user. In accordance with the second embodiment, however, a video reply message is created by executing coding processing based upon a low transfer rate (e.g., the minimum transfer rate) at all times. At transmission of the reply message, the shortfall in the video data is made up for by inclusion of invalid bits and speed is adjusted to transmit a reply message composed of audio and video.

(a) Creation of Reply Message (See FIG. 3)

The video A/D converter 15 converts the analog video signal that has entered from the camera 11 to digital video data, the video coder 16 codes the digital video data based upon the minimum transfer rate, and the CPU 31 stores the coded video data in the video reply message storage unit 32 as the video reply message VRMG. The A/D converter 21 converts the analog audio signal that has entered from the microphone 12 to digital audio data, the audio coder 22 applies coding processing to the digital video data based upon a fixed transfer rate (e.g., 56 kbps), and the CPU 31 stores the coded audio data in the audio reply message storage unit 33 as the audio reply message SRMG.

(b) Transmission of Reply Message

Figure 11:
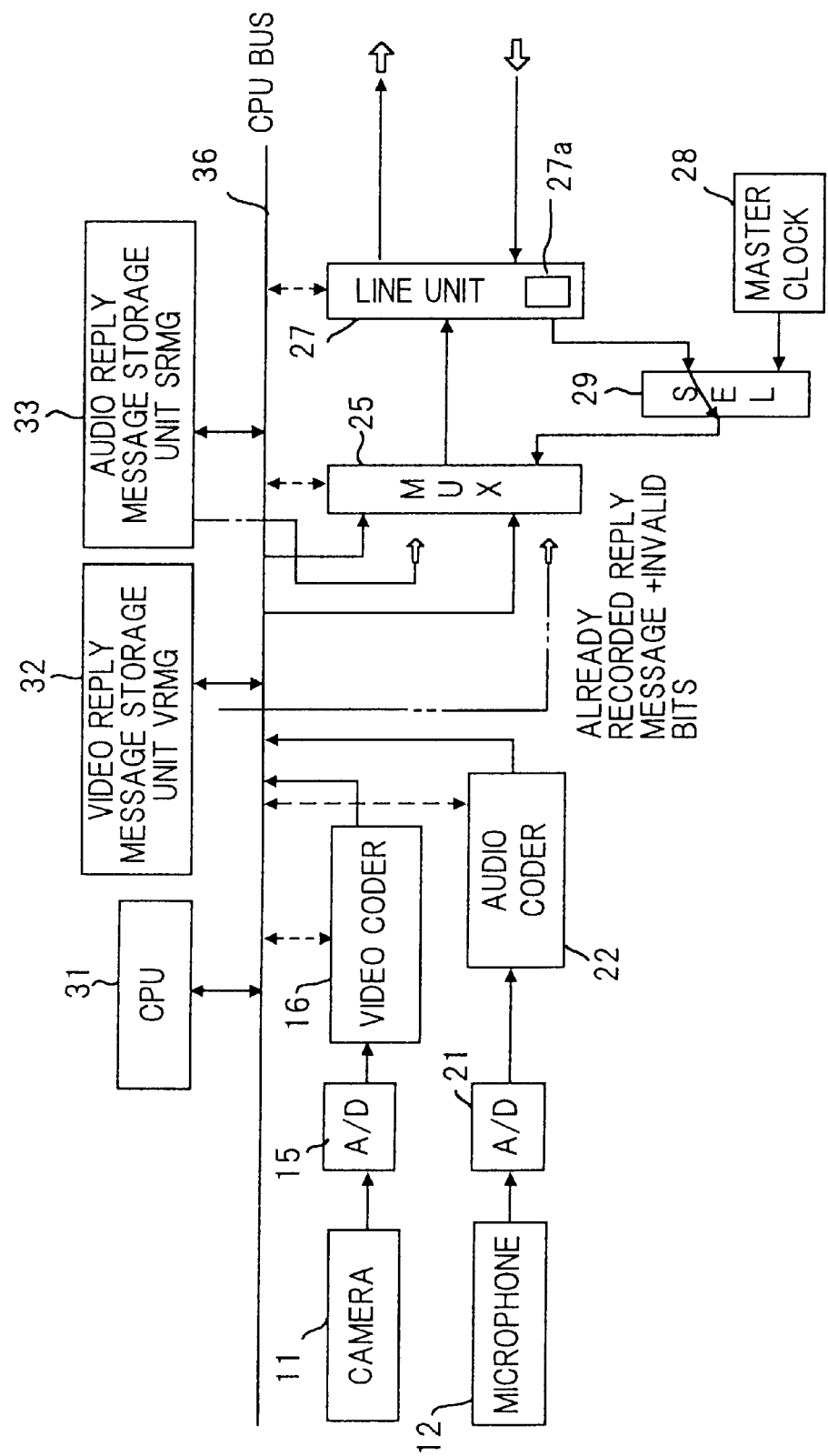
FIG. 11 is a diagram useful in describing control for transmitting a reply message according to a second embodiment of the present invention.

FIG. 11 is a diagram useful in describing control for transmitting a reply message according to the second embodiment. Components identical with those shown in FIG. 1 are designated by like reference characters.

If an incoming call arrives after the automatic answering and recording mode has been established, the CPU 31 compares the actual transfer rate B decided by the transfer rate decision means 27a and the transfer rate (minimum transfer rate) A used when the video data is compressed. If the transfer rates agree, the CPU 31 reads the video reply message VRMG out of the video reply message storage unit 32, enters this message into the multiplexer 25, reads the audio reply message SRMG out of the video reply message storage unit 32 and enters this message into the multiplexer 25. The multiplexer 25 multiplexes the video reply message VRMG and audio reply message SRMG and transmits the multiplexed messages via the line unit 27.

If the transfer rates do not agree (A≠B), however, the CPU 31 generates a prescribed number of invalid bits periodically for a period of time conforming to the difference (=B−A) between the actual transfer rate and the minimum transfer rate, and the multiplexer 25 multiplexes these invalid bits, the video reply message VRMG and audio reply message SRMG and sends these to the line via the line unit 27. For example, the quantity of invalid bits sent is calculated from the difference between the actual transfer rate B and the minimum transfer rate A and the invalid bits in the calculated quantity are inserted into the reply message RMG at regular intervals to adjust the bit rate.

FIGS. 12A~12D are diagrams useful in describing transmission frames of reply messages RMG in cases where the minimum transfer rate is 128 kbps and the actual transfer rate is 192 kbps.

Figure 12A:
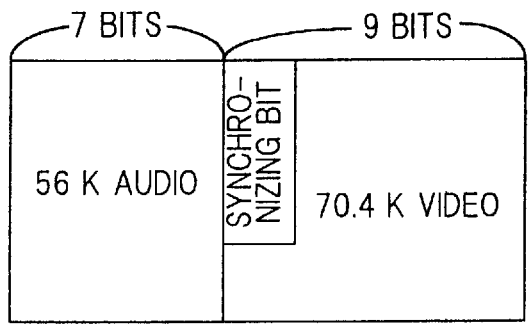
FIGS. 12A–12D are diagrams useful in describing transmission frames which prevail when a reply message is transmitted.
Figure 12B:
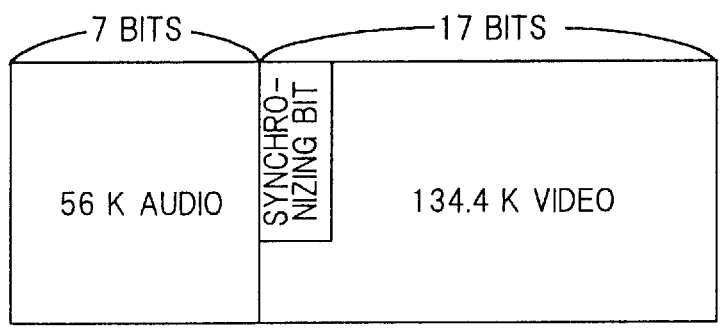

In the case where the transfer rate is 128 kbps, the structure of the frame of multiplexed data obtained by multiplexing the audio and video data is as shown in FIG. 12A. In the case where the transfer rate is 192 kbps, the structure of the frame of multiplexed data obtained by multiplexing the audio and video data is as shown in FIG. 12B.

Figure 12C:
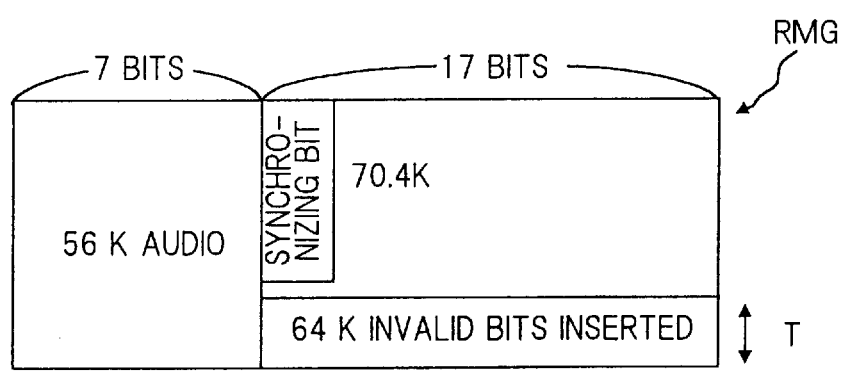
Figure 12D:
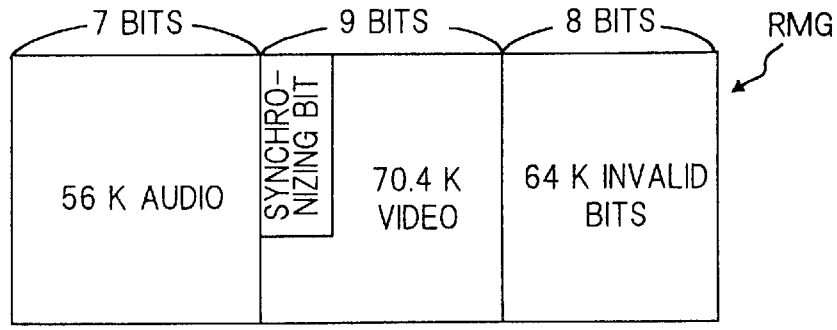

Accordingly, if a reply message at the time of compression at the transfer rate of 128 kbps is transferred at the transfer rate of 192 kbps, the reply message will have a shortfall of 64 kbps. Accordingly, invalid bits of 64 kbps are inserted for a period of time indicated by T per second, as shown in FIG. 12C, to adjust the bit rate. Alternatively, invalid bits of 64 kbps are inserted eight bits at a time to adjust the bit rate, as shown in FIG. 12D.

By thus inserting invalid bits of a prescribed number at the intervals of the transmission frames, audio and video can be synchronized and adjustment of the bit rate is possible. In other words, regardless of the actual transfer rate, a reply message consisting of audio and video can be transmitted if the quantity of invalid bits to be sent can be calculated.

FIG. 13 is a flowchart of processing for transmitting a reply message. This processing can be executed by substituting it for step 206 in FIG. 8.

If the actual transfer rate B is acquired (step 205 in FIG. 8), the CPU 31 executes reply message transmission processing in accordance with FIG. 13 (step 206). First, "audio+video capability" is transmitted to the originating terminal by the BAS data (step 301), after which the actual transfer rate B and the transfer rate (minimum transfer rate) A which prevailed at creation of the reply message file are compared (step 302). If A=B holds, the video reply message VRMG and audio reply message SRMG are read out of the video reply message storage unit 32 and audio reply message storage unit 33, respectively, the messages are multiplexed and the multiplexed data is sent to the originating terminal (step 303).

If A≠B and not A=B is found to hold at step 302, on the other hand, the quantity n (kbps) of invalid bits to be sent is calculated (step 304) in accordance with the following equation:

$$\begin{aligned} n &= (\text{actual transfer rate}) - (\text{minimum transfer rate}) \\ &= B - A \end{aligned}$$

where n represents the number of invalid bits inserted into the reply message in one second.

Next, the invalid bits are inserted into the audio data and video data of the reply message, as shown in FIG. 12C or 12D, and the resulting data is transmitted (step 305).

If this arrangement is adopted, a video reply message can be transmitted and displayed on the other party's monitor at the image quality that prevailed at the time of reply message creation without being displayed in a frame-by-frame or fast-forward manner.

(D) Third Embodiment

In the second embodiment, a video reply message is created by executing coding processing based upon the minimum transfer rate, the shortfall in the video data is made up for by inclusion of invalid bits and speed is adjusted at transmission of the reply message to thereby transmit a reply message composed of audio and video. With the method of the second embodiment, however, the image constituting the reply can be displayed on the other party's monitor only at a quality that conforms to the minimum transfer rate.

Accordingly, in the third embodiment of the invention, it is so arranged that the image constituting the reply can be displayed on the other party's monitor only at a quality that conforms to the actual transfer rate. To achieve this, the third embodiment is so adapted that the video is coded based upon a high bit rate (e.g., the maximum transfer rate) and then stored in the video reply message storage unit 32. When the reply message is transmitted, the message is decoded by the video decoder 17, after which the message is coded by the video coder based upon the actual transfer rate and then transmitted.

(a) Creation of Reply Message (See FIG. 3)

The video A/D converter 15 converts the analog video signal that has entered from the camera 11 to digital video data, the video coder 16 codes the digital video data based upon the maximum transfer rate, and the CPU 31 stores the coded video data in the video reply message storage unit 32 as the video reply message VRMG. The A/D converter 21 converts the analog audio signal that has entered from the microphone 12 to digital audio data, the audio coder 22 applies coding processing to the digital video data based upon a fixed transfer rate (e.g., 56 kbps), and the CPU 31 stores the coded audio data in the audio reply message storage unit 33 as the audio reply message SRMG.

(b) Transmission of Reply Message

Figure 14:
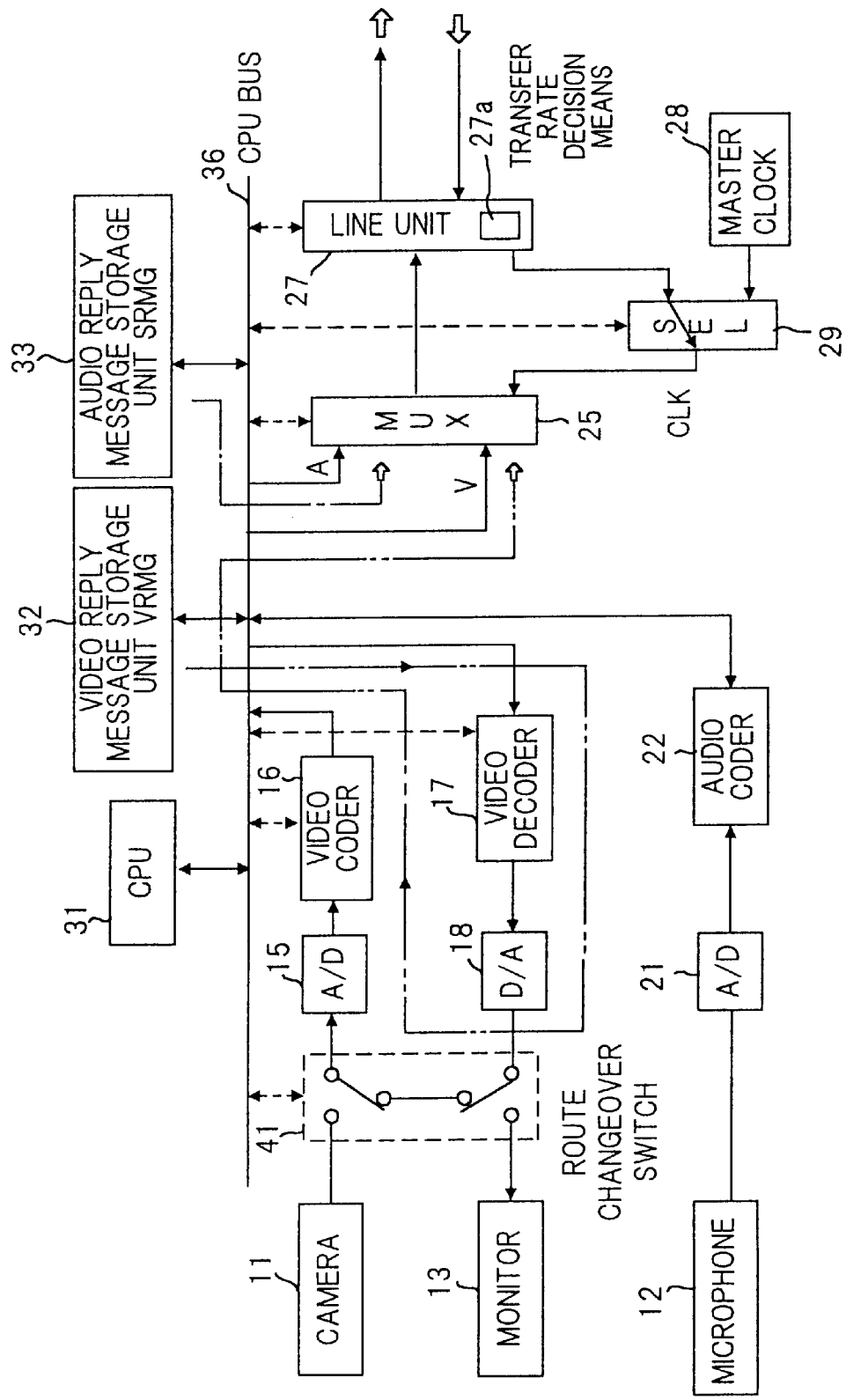
FIG. 14 is a diagram useful in describing control for transmitting a reply message according to a third embodiment of the present invention.

FIG. 14 is a diagram useful in describing control for transmitting a reply message according to the third embodiment. Components identical with those shown in FIG. 1 are designated by like reference characters. The arrangement shown in FIG. 14 includes a route changeover switch 41. The switch 41 is in the state shown in FIG. 14 only when a reply message is transmitted; at all other times the switch 41 connects the camera 11 with the video A/D converter 15 and the monitor 13 with the D/A converter 18.

If an incoming call arrives after the automatic answering and recording mode has been established, the CPU 31 changes over the route changeover switch 41 to the state shown in FIG. 14 and sets the actual transfer rate decided by the transfer rate decision means 27a in the video coder 16.

Further, the CPU 31 reads the video reply message VRMG out of the video reply message storage unit 32, in which it has been stored, at the high bit rate (maximum transfer rate) and enters the message into the video decoder 17. The latter executes decoding processing at the high bit rate (maximum transfer rate) which prevailed when the video reply message was created, and the D/A converter 18 converts the digital video data obtained by the decoding processing to an analog video signal. The analog video signal resulting from the conversion is entered into the video A/D converter 15 via the route changeover switch 41.

The video A/D converter 15 converts the analog video signal that has entered from the D/A converter 18 to digital video data, and the video coder 16 codes the digital video data based upon the actual transfer rate and applies the video data to the multiplexer 25. In parallel with the above operation, the CPU 31 reads the audio reply message (audio data) SRMG out of the audio reply message storage unit 33 and enters this data into the multiplexer 25. The latter multiplexes the entered video data and audio data and sends the multiplexed data to the line via the line unit 27.

In accordance with this method, video having a quality commensurate with the actual transfer rate can be transmitted to the originating terminal and displayed on its monitor regardless of the actual transfer rate.

(E) Fourth Embodiment

Figure 15:
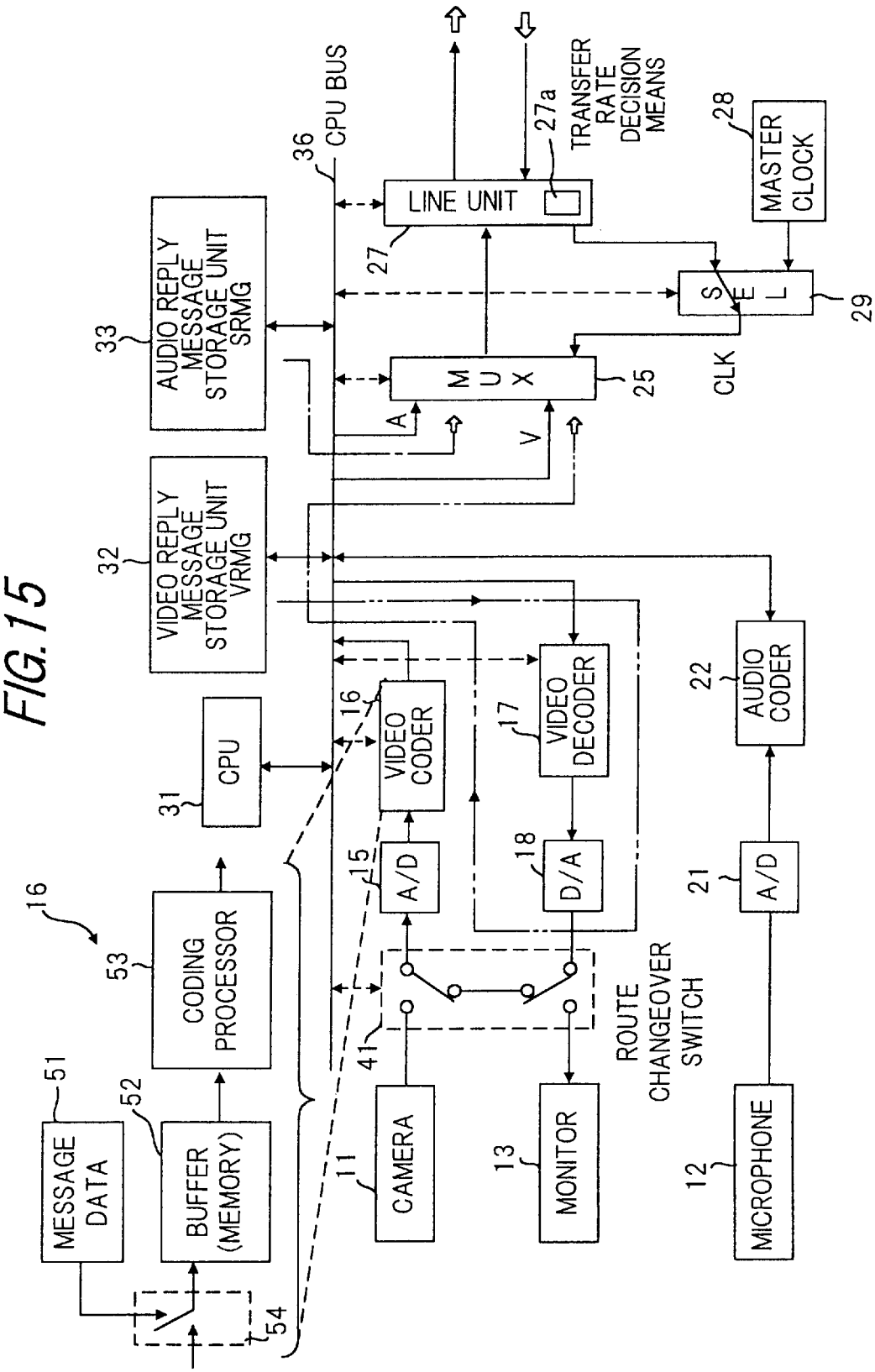
FIG. 15 is a block diagram showing the principal components of a video conference set according to a fourth embodiment of the present invention.

According to a fourth embodiment of the invention, video to be transmitted following completion of the transmission of a reply message is stored in advance. Then, after the reply message is transmitted, the stored video is transmitted repeatedly in continuous fashion. FIG. 15 is a block diagram showing the principal components of a video conference set according to the fourth embodiment. Components identical with those shown in FIG. 14 are designated by like reference characters.

The video coder 16 shown in FIG. 15 includes a message data storage unit 51 for storing message data (one frame of still-picture data) such as "YOUR MESSAGE IS BEING RECORDED", a buffer memory 52 for temporarily storing video data, a coding processor 53 for successively applying coding processing to the video data that has been stored in the buffer memory, and a buffer switch 54 for selectively connecting the video A/D converter 15 and the message data storage unit 51 to the buffer memory 52. The buffer switch 54 connects the message data storage unit 51 to the buffer memory 52 only when a calling-party message is received following completion of transmission of the reply message. At all other times the buffer switch 54 connects the video A/D converter 15 to the buffer memory 52.

In operation, the message data (the still picture) sent to the originating terminal after the transmission of the reply message is completed is stored beforehand in the message data storage unit 51 in the video coder 16. An example of the message data (the still picture) is "YOUR MESSAGE IS BEING RECORDED".

When transmission of the reply message has been completed, the CPU 31 switches the buffer switch 54 to the message data storage unit 51. As a result, the video signal from the camera 11 is interrupted and the message data is transferred to the buffer 52 instead. The coding processing 53 subjects the video data that has been stored in the buffer memory 52 to coding processing in successive fashion and outputs the coded video data. The coded video data is sent to the originating terminal via the multiplexer 25 and line unit 27. The originating terminal receives the data through a procedure similar to that used for an ordinary conference image (which is a moving picture) and displays the image on its monitor screen. It should be noted that since the video coder 16 codes the message data based upon the actual transfer rate, any transfer rate can be accommodated.

The same message data is entered into the buffer memory 52 repeatedly and the coding processor 53 subjects the same message data to coding processing repeatedly and outputs the coded data. As a result, the same still picture continues to be displayed on the monitor of the originating terminal.

Figure 16:
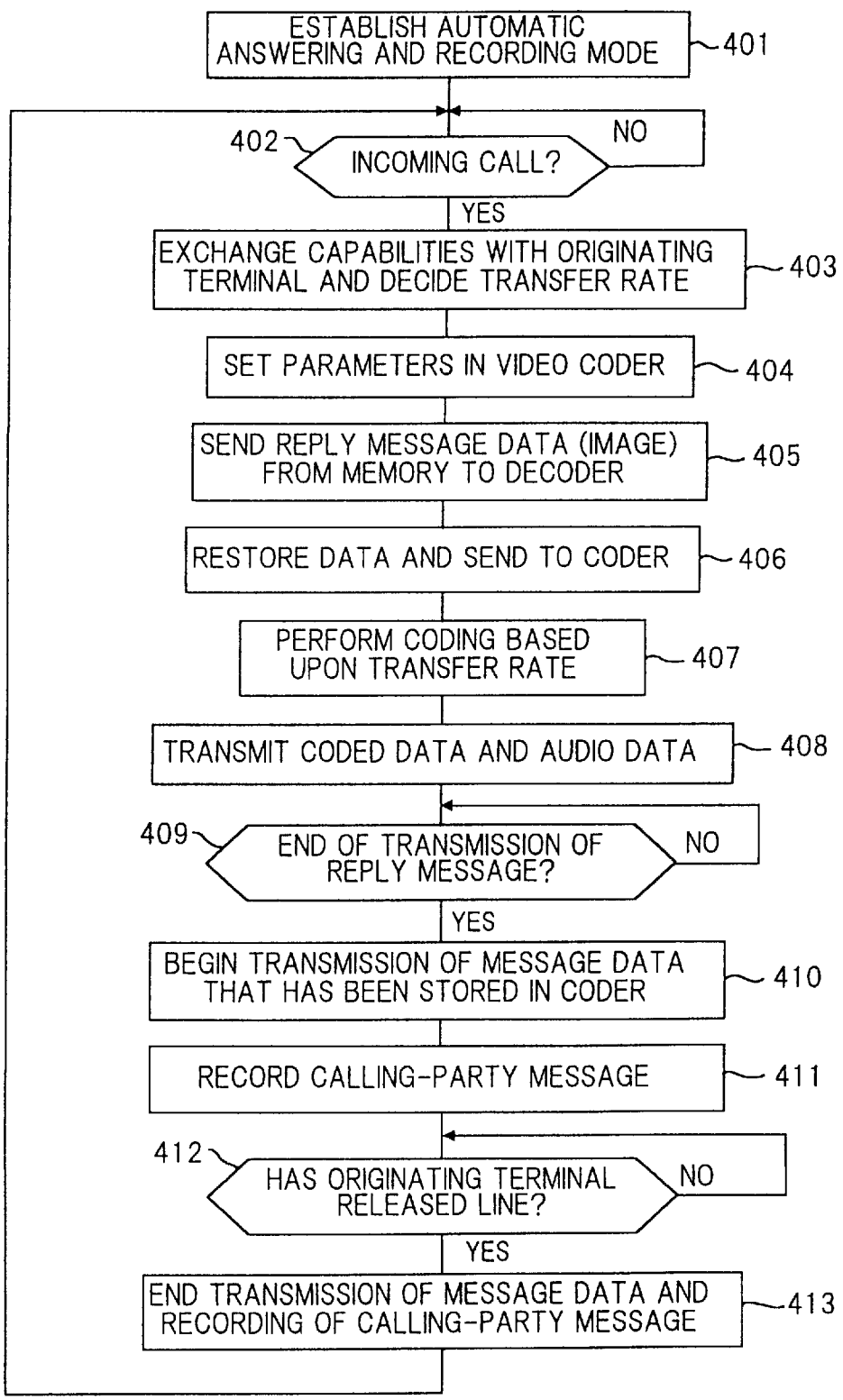
FIG. 16 is a flowchart of processing according to the third and fourth embodiments.
Figure 17:
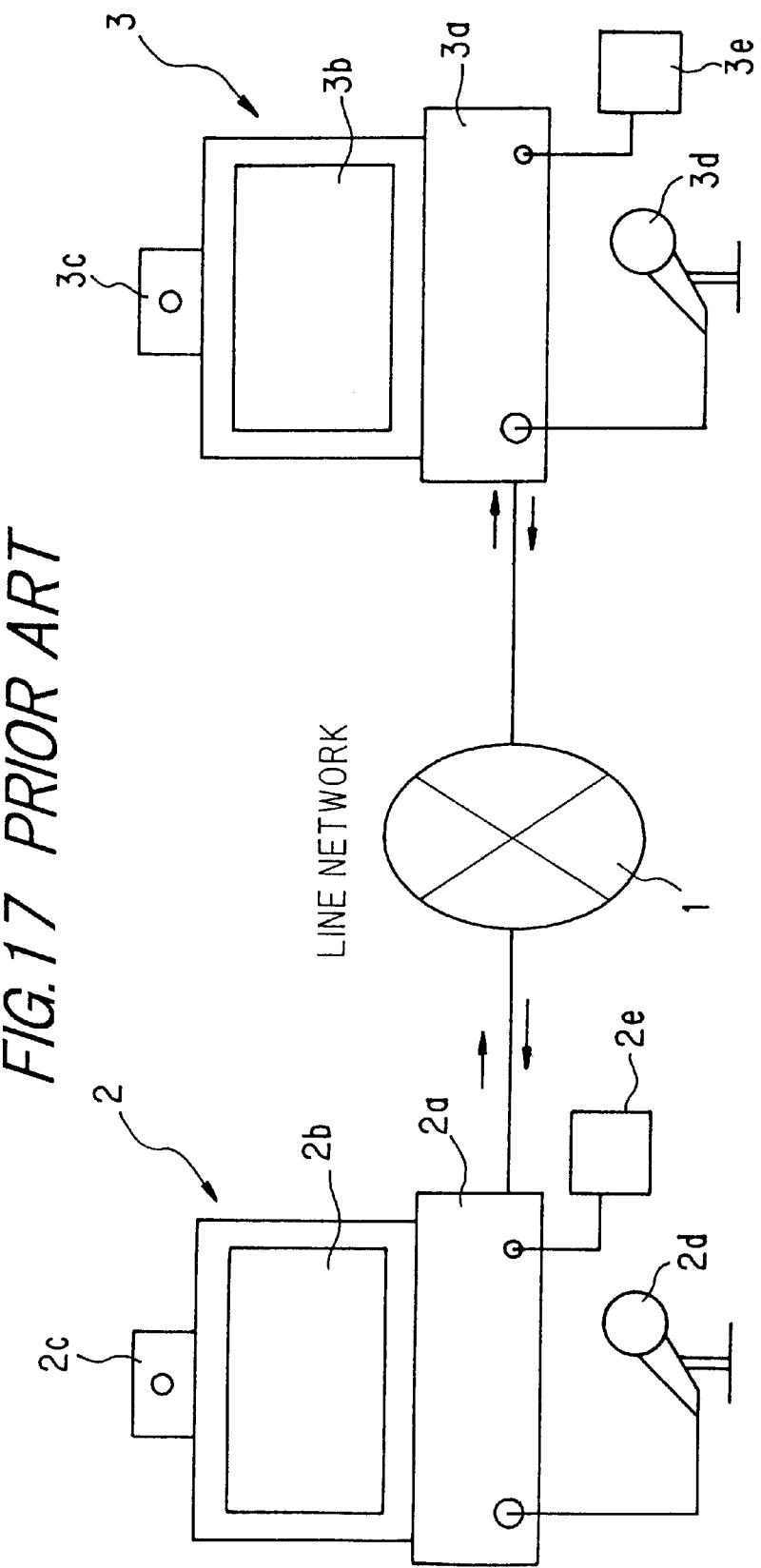
FIG. 17 is a diagram showing the configuration of a video conference system.
Figure 18:
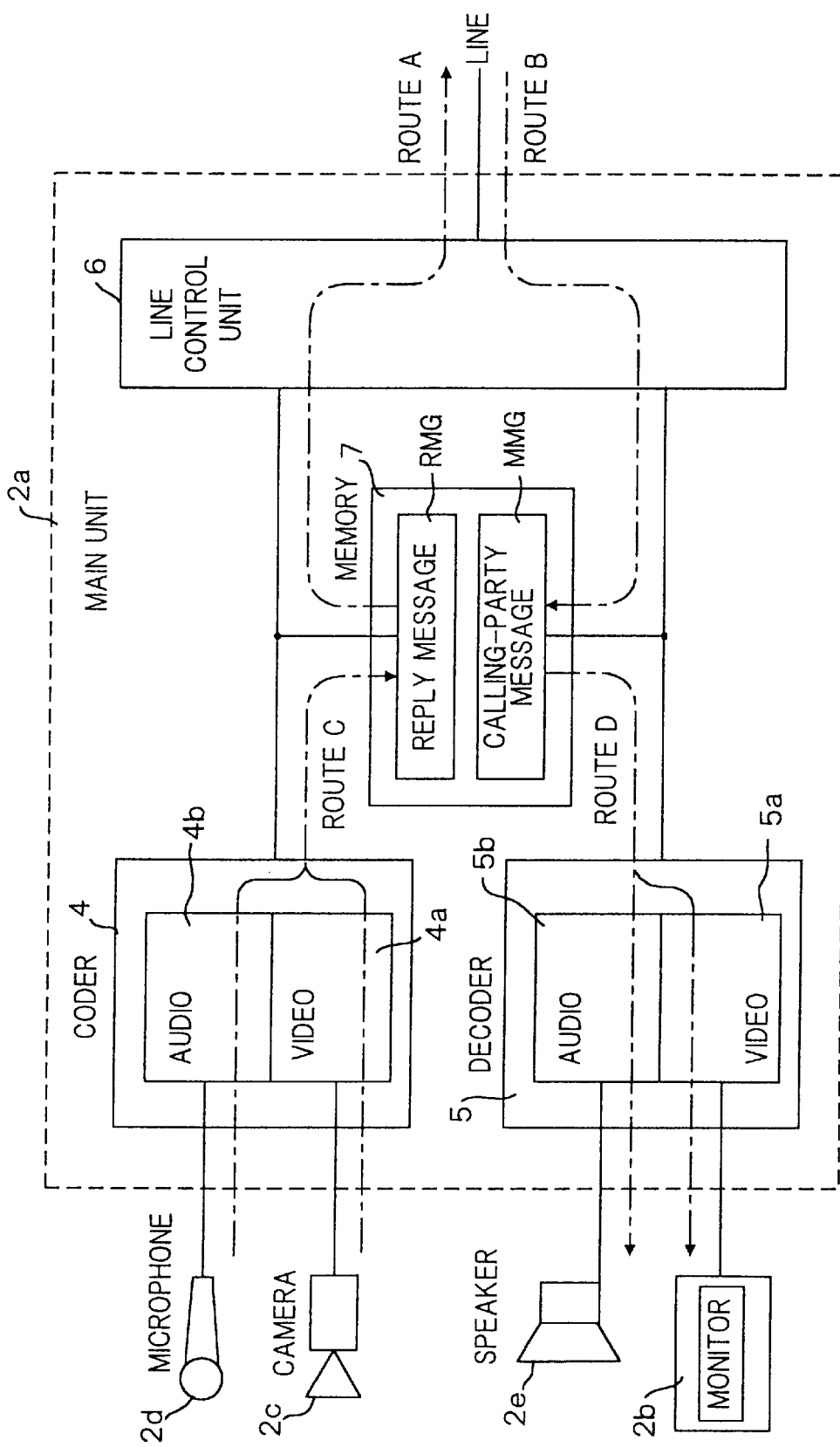
FIG. 18 is a block diagram illustrating a video conference set having an automatic answer and recording function according to the prior art.
Figure 19:
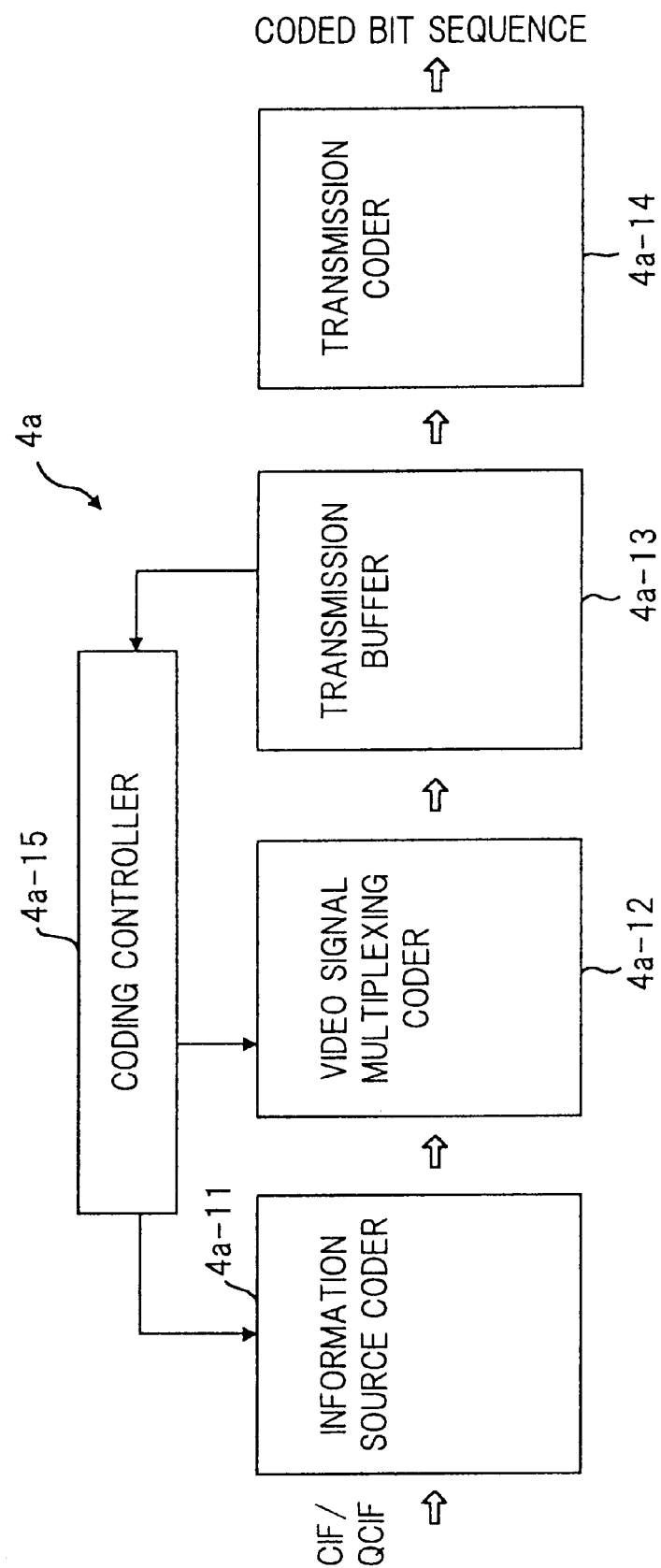
FIG. 19 is a diagram illustrating the construction of a video coder.
Figure 20:
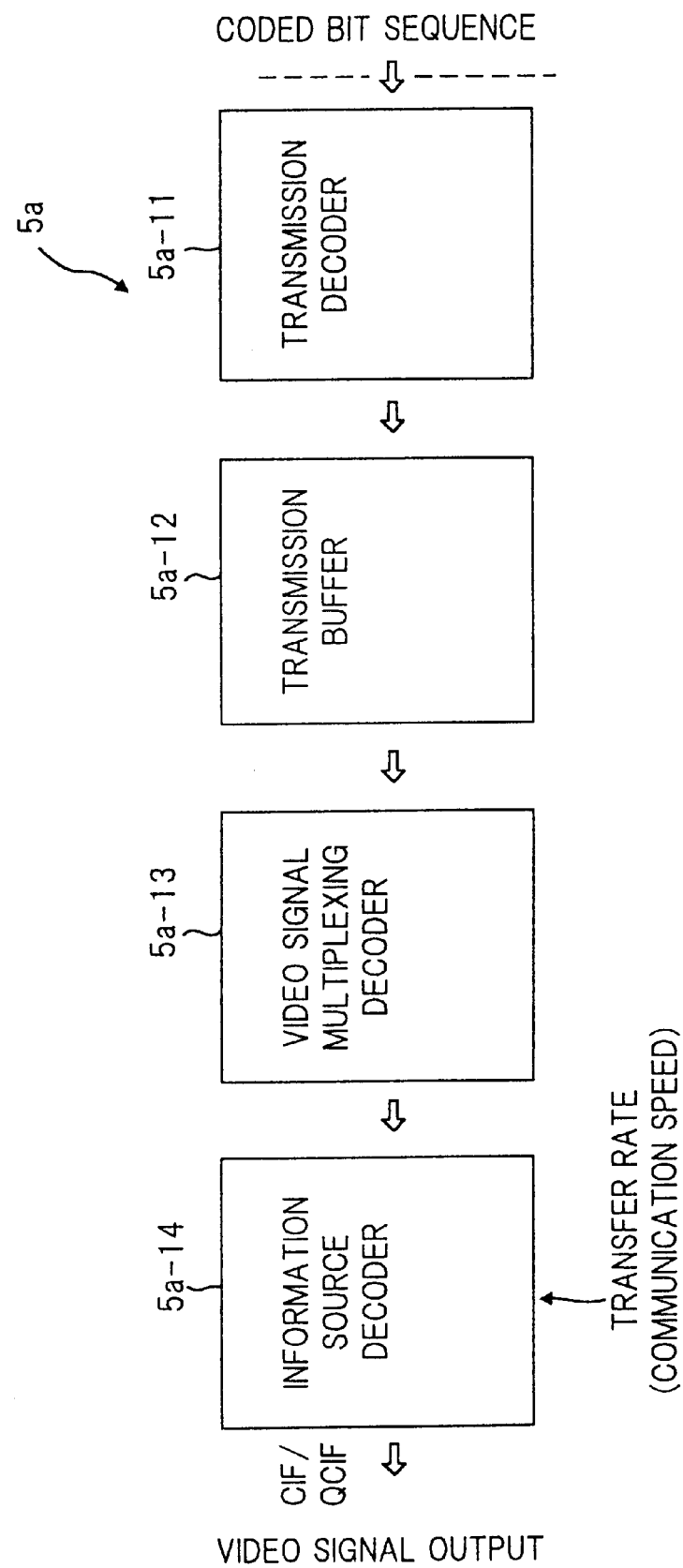
FIG. 20 is a diagram illustrating the construction of a video decoder.

FIG. 16 is a flowchart of processing according to the third and fourth embodiments.

If an incoming call arrives after the apparatus has been placed in the automatic answering and recording mode (steps 401, 402), the line unit 27 executes a line protocol (the H.221 protocol) and coordinates conditions for the connection to the other terminal. At this time the transfer rate decision means 27a reads the transfer rate, which is requested by the originating terminal, by referring to the "BAS data block" in the H.221 data, decides the transfer rate of the line and so notifies the CPU 31 (step 403).

On the basis of the transfer rate information, the CPU 31 sets various parameters necessary for coding in the video coder 16. The CPU 31 further changes over the route changeover switch 41 to the state shown in FIG. 15 (step 404). The changeover of this switch may be performed when the automatic answering and recording mode is established.

Next, the CPU 31 sends the reply message data, which has been stored in the video reply message storage unit 32 at the maximum transfer rate, to the video decoder 17, which proceeds to decode the data (step 405). The decoded image data enters the video coder 16 via the D/A converter 18, route changeover switch 41 and video A/D converter 15 (step 406). The video coder 16 subjects the video data to image coding processing based upon the actual transfer rate and sends the coded data to the multiplexer 25 (step 407).

In parallel with the foregoing, the CPU 31 reads the audio reply message (audio data) SRMG out of the audio reply message storage unit 33 and enters the data into the multiplexer 25. The multiplexer 25 multiplexes the entered video data and audio data and sends the multiplexed data to the line via the line unit 27 (step 408).

The above-described processing for transmitting the reply message is executed until the transmission of the reply message is completed. When transmission of the reply message is completed (step 409), the CPU 31 changes over the buffer switch 54 to connect the message data storage unit 51 to the buffer memory 52.

As a result of the processing described above, message data such as "YOUR MESSAGE IS BEING RECORDED" read out of the message data storage unit 51 is written to the buffer memory 52. The coding processor 53 codes the message data and transmits the coded data to the originating terminal via the multiplexer 25 and line unit 27 (steps 410, 411). In parallel with the transmission of the message data, the calling-party message is received from the originating terminal and stored in the calling-party message storage unit 34.

Thereafter, until the originating terminal releases the line, the message data is coded and transmitted repeatedly and the message data image (the still picture) is displayed on the monitor of the originating terminal. After the line is released (step 412), processing for transmitting the message data and for recording the calling-party message is terminated (step 413) and the apparatus waits for the next incoming call.

In accordance with the present invention, a reply message can be composed of video and audio, and a variety of different actual transfer rates can be accommodated merely by storing a single video reply message coded based upon a prescribed transfer rate.

In accordance with the present invention, video data is coded based upon a prescribed transfer rate and is stored as a video reply message. If this transfer rate agrees with the actual transfer rate, the video reply message and an audio reply message are multiplexed and transmitted. If the two transfer rates differ, only the audio reply message is transmitted. If this arrangement is adopted, video and audio can be included in a reply message in a case where the two transfer rates agree.

In accordance with the present invention, video data that has been acquired from a camera is compressed based upon a low transfer rate (e.g., the minimum transfer rate) set in advance, and the compressed data is stored as a video reply message. At arrival of an incoming call from an originating terminal, the actual transfer rate at which communication is performed with the originating terminal is compared with the low transfer rate. If the two compared transfer rates agree, an audio reply message and a video reply message are multiplexed at sent to a line. If the transfer rates are different, invalid bits are generated for a period of time conforming to the speed difference between the actual transfer rate and the low transfer rate, and the invalid bits, the audio reply message and the video reply message are multiplexed and sent to the line. If this arrangement is adopted, video having a quality commensurate with the minimum transfer rate can be displayed on the monitor of the originating terminal.

In accordance with the present invention, video data that has entered from a camera is compressed based upon a preset high transfer rate (e.g., the maximum transfer rate) and is stored as a video reply message when the video reply message is created. At arrival of an incoming call in the automatic answering and recording mode, a video decoder decodes the video reply message and a video coder codes the video data, which has been obtained by decoding, at the actual transfer rate. The video reply message obtained by coding and an audio reply message are multiplexed and sent to the line. If this arrangement is adopted, video having a quality commensurate with the actual transfer rate can be transmitted to the originating terminal and displayed on its monitor regardless of the actual transfer rate.

In accordance with the present invention, message data (a still picture) is transmitted to an originating terminal and is displayed on its monitor when a message is received from the originating terminal after it is sent a reply message from the called terminal. As a result, the user of the originating terminal is not given an odd impression.

In accordance with the present invention, a calling-party message from an originating terminal is not demultiplexed into audio and video but is stored in the multiplexed form. Then, when the message is played back by the called apparatus, it is separated into audio and video, the audio is input to a speaker and the video to a monitor. This means that it is unnecessary to synchronize the audio and video when the calling-party message is played back.

In accordance with the present invention, a limit is placed upon the sizes of a reply message file and calling-party message file, and a limit is placed also upon the number of calling-party message files that can be stored in memory. This makes it possible to reduce the storage capacity of memory means, reduce the size of the apparatus and lower cost.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus having an automatic answering and recording function in which video data and audio data compressed by a video coder and an audio coder, respectively, are multiplexed by a multiplexer and sent to a line, a signal that has entered from the line is demultiplexed into audio data and video data by a demultiplexer and is subsequently restored to an original audio signal and an original video signal by a video decoder and an audio decoder, respectively, and the audio and video are output from an audio unit and a monitor, respectively, wherein when an incoming call arrives, in an automatic answering and recording mode, from an originating terminal, a reply message comprising video and audio is transmitted to the originating terminal and a calling-party message sent from the originating terminal is recorded, said apparatus comprising:

memory means for storing the reply message separately as a video reply message and an audio reply message, as well as the calling-party message, and control means for storing the audio reply message and the video reply message in said memory means separately;

wherein when an incoming call has arrived in the automatic answering and recording mode, said control means reads the separately stored audio reply message and video reply message out of said memory means and enters them into the multiplexer, and stores the calling-party message, which has entered from the line, in said memory means in a multiplexed format without separating this message into audio and video; and when the calling-party message is to be output, said control means reads the calling-party message out of said memory means and enters the message into the demultiplexer.

2. The apparatus according to claim 1, further comprising:

means for specifying a transfer rate necessary to compress video data; and means for deciding an actual transfer rate at which communication is performed with the originating terminal;

wherein the video coder compresses video data, which has been acquired from a camera, based upon the transfer rate specified;

the audio coder compresses audio data, which has been acquired from a microphone, at a fixed transfer rate and in such a manner that communication can be performed at a prescribed quality; and said control means:

stores the image data and the audio data compressed by said video coder and said audio coder, respectively, in said memory means as the video reply message and the audio reply message;

compares the actual transfer rate, at which communication is performed with the originating terminal, and the specified transfer rate when the reply message is transmitted to the originating terminal;

multiplexes the audio reply message and the video reply message and sends the messages to the line if the transfer rates compared agree; and sends only the audio reply message and not the video reply message to the line if the transfer rates compared differ.

3. The apparatus according to claim 1, further comprising:

means for deciding an actual transfer rate at which communication is performed with the originating terminal;

wherein the video coder compresses video data, which has been acquired from a camera, based upon a low transfer rate set in advance;

the audio coder compresses audio data, which has been acquired from a microphone, at a fixed transfer rate; and said control means:

stores the image data and the audio data compressed by said video coder and said audio coder, respectively, in said memory means as the video reply message and the audio reply message;

compares the actual transfer rate, at which communication is performed with the originating terminal, and the low transfer rate when the reply message is transmitted to the originating terminal;

multiplexes the audio reply message and the video reply message and sends the messages to the line if the transfer rates compared agree; and generates invalid bits, for a period of corresponding to a rate difference between the actual transfer rate and the low transfer rate, multiplexes the invalid bits, the audio reply message and the video reply message and sends them to the line if the transfer rates compared differ.

4. The apparatus according to claim 1, further comprising:

switch means for selectively connecting an output side of the video decoder and an output side of a camera to an input side of the video coder; and means for deciding an actual transfer rate at which communication is performed with the originating terminal;

wherein the video coder compresses video data that has entered from the side of the camera based upon a preset high transfer rate when the video reply message is created, and compresses video data that has entered from the side of the video decoder based upon a transfer rate, which is specified by said control means, when the video reply message is transmitted;

the audio coder compresses audio data, which has been acquired from the microphone, at a fixed transfer rate and in such a manner that communication can be performed at a prescribed quality; and said control means:

stores the video data from the camera side compressed by the video coder and the audio data compressed by the audio coder in said memory means as the video reply message and audio reply message, respectively, when the reply message is created; and when the reply message is transmitted, controls said switch means in such a manner that the video reply message, which has been read out of said memory means, is input to the video coder via the video decoder, inputs the video coder an actual transfer rate as said specified transfer rate, multiplexes a video reply message, which is obtained by compression processing by the video coder based upon the actual transfer rate, and the audio reply message and sends the multiplexed messages to the line.

5. The apparatus according to claim 1, further comprising storage means for storing video to be sent following completion of transmission of the reply message;

wherein after transmission of the reply message is completed, said control means repeatedly transmits the video, which has been stored in said storage means, in continuous fashion.

6. The apparatus according to claim 1, wherein when a reply message file is created and stored in said memory means, said control means monitors file size of the reply message file during creation thereof and terminates processing for creating the reply message file if the file size exceeds a set value.

7. The apparatus according to claim 1, wherein when a calling-party message file is created and stored in said memory means, said control means monitors file size of the calling-party message file during creation thereof and terminates processing for creating the calling-party message file if the file size exceeds a set value.

8. The apparatus according to claim 7, wherein said control monitors number of created calling-party message files and forgoes execution of the automatic answering and recording function, even if there is an incoming call, when the number of calling-party message files exceeds the set value.

* * * * *